US012691468B2

(12) United States Patent
Tennebroek et al.

(10) Patent No.: US 12,691,468 B2
(45) Date of Patent: Jul. 28, 2026

(54) PROCESS FOR PROVIDING LOW GLOSS COATINGS

(71) Applicant: Covestro (Netherlands) B.V., Geleen (NL)

(72) Inventors: Ronald Tennebroek, Dongen (NL); Ilse van Casteren, Veldhoven (NL); Johan Franz Gradus Antonius Jansen, Geleen (NL); Michael Villet, Maastricht (NL); Daan Huisman, Eindhoven (NL)

(73) Assignee: Covestro (Netherlands) B.V., Geleen (NL)

( * ) Notice: Subject to any disclaimer, the term of this patent is extended or adjusted under 35 U.S.C. 154(b) by 0 days.

(21) Appl. No.: 18/865,393

(22) PCT Filed: May 24, 2023

(86) PCT No.: PCT/EP2023/063964
§ 371 (c)(1),
(2) Date: Nov. 13, 2024

(87) PCT Pub. No.: WO2023/227680
PCT Pub. Date: Nov. 30, 2023

(65) Prior Publication Data

US 2025/0360534 A1 Nov. 27, 2025

(30) Foreign Application Priority Data

May 25, 2022 (EP) .................................... 22175395
May 25, 2022 (EP) .................................... 22175396

(51) Int. Cl.
*B05D 3/06* (2006.01)
*B05D 3/04* (2006.01)
*C09D 151/08* (2006.01)

(52) U.S. Cl.
CPC ........... *B05D 3/062* (2013.01); *B05D 3/0413* (2013.01); *B05D 3/067* (2013.01); *C09D 151/08* (2013.01);
(Continued)

(58) Field of Classification Search
CPC ...................................................... B05D 3/061
See application file for complete search history.

(56) References Cited

U.S. PATENT DOCUMENTS 4,313,969 A * 2/1982 Matthews .............. B05D 3/068
427/520
4,324,744 A 4/1982 Lechtken et al.
(Continued)

FOREIGN PATENT DOCUMENTS

CN 111032234 A * 4/2020 ........... B05D 3/0209
EP 3083736 B1 * 3/2018 ......... C08G 18/4854

OTHER PUBLICATIONS

Becker et al. 111032234A translation. Apr. 2020 (Year: 2020).*
(Continued)

*Primary Examiner* — Cachet I Proctor
(74) *Attorney, Agent, or Firm* — Donald R. Palladino

(57) ABSTRACT

The present invention relates to a process for producing a coating from an aqueous, radiation-curable coating composition, wherein the process comprises the steps in the sequence (1) to (4):
(1) applying an aqueous, radiation-curable coating composition on a surface of a substrate,
(2) drying the aqueous, radiation-curable coating composition, affording an at least partially dried coating composition,
(3) irradiating the at least partially dried coating composition with UV light having a wavelength s 220 nm under inert atmosphere, followed by
(Continued)

(4) irradiating with UV light having a wavelength 300 nm or with E-beam, wherein the aqueous, radiation-curable coating composition is a dispersion comprising:

(A) at least one water-dispersible polyurethane (A), wherein the polyurethane (A) has a urea group (—NH—CO—NH—) concentration of at least 0.1 milli-equivalents per g of polyurethane (A) and of at most 2.6 milli-equivalents per g of polyurethane (A) and the polyurethane (A) is essentially free of radiation-curable, ethylenically unsaturated bonds, (B) at least one radiation-curable diluent (B) with a molar mass less than 750 g/mol and with an acrylate functionality of from 2 to 5, and (C) water and optionally organic solvent, whereby the optional organic solvent is present in an amount of at most 30 wt. %, based on the total amount of water and organic solvent, wherein the amount of (A) is from 30 to 85 wt. % and the amount of (B) is from 15 to 70 wt. %, based on the total amount of (A) and (B).

20 Claims, 1 Drawing Sheet

(52) U.S. Cl.
CPC ...... *B05D 2401/20* (2013.01); *B05D 2401/31* (2013.01); *B05D 2503/00* (2013.01)

(56) References Cited

U.S. PATENT DOCUMENTS

| | | | | | |
|---|---|---|---|---|---|
| 4,411,931 | A * | 10/1983 | Duong | B29C 59/16 427/493 |
| 4,485,123 | A * | 11/1984 | Troue | B05D 3/067 427/493 |
| 4,737,593 | A | 4/1988 | Ellrich et al. | |
| 5,534,559 | A | 7/1996 | Leppard et al. | |
| 5,942,290 | A | 8/1999 | Leppard et al. | |
| 6,020,528 | A | 2/2000 | Leppard et al. | |
| 6,020,529 | A | 2/2000 | Fremy | |
| 6,048,660 | A | 4/2000 | Leppard et al. | |
| 6,440,500 | B1 * | 8/2002 | Sigel | B05D 3/068 427/508 |
| 6,486,226 | B2 | 11/2002 | Al-Akhdar et al. | |
| 6,486,228 | B2 | 11/2002 | Kohler et al. | |
| 6,596,445 | B1 | 7/2003 | Matsumoto et al. | |
| 7,169,826 | B2 | 1/2007 | Sitzmann et al. | |
| 7,837,319 | B2 * | 11/2010 | Rodin | B41M 7/0072 118/620 |
| 9,073,082 | B2 | 7/2015 | Fischer et al. | |
| 9,631,116 | B2 * | 4/2017 | Van Casteren | C09D 175/16 |
| 9,708,442 | B1 | 7/2017 | Kwisnek et al. | |
| 9,994,730 | B2 | 6/2018 | Tennebroek et al. | |
| 11,969,753 | B2 | 4/2024 | Becker et al. | |

OTHER PUBLICATIONS

International Search Report, PCT/EP2023/063964, date of mailing: Jul. 24, 2023, Authorized officer: Martin Sütterlin.

U.S. Appl. No. 18/865,402, filed Nov. 13, 2024, entitled: Process for Providing Low Gloss Coatings, Tennebroek et al.

* cited by examiner

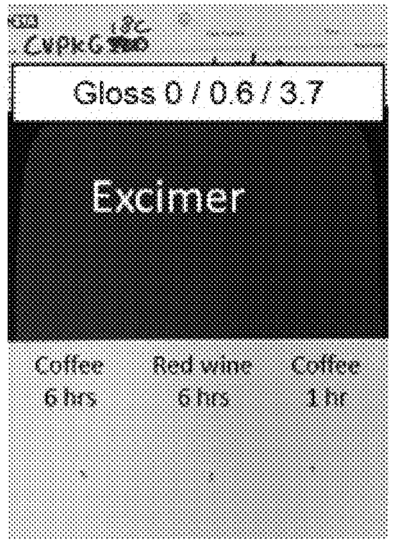
Gloss 0 / 0.6 / 3.7
Excimer
Coffee
6 hrs
Red wine
6 hrs
Coffee
1 hr
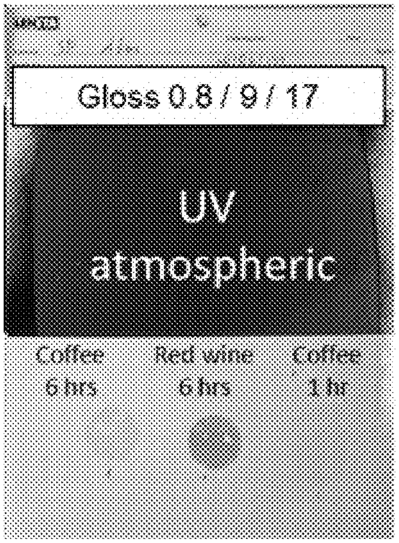
Gloss 0.8 / 9 / 17
UV
atmospheric
Coffee
6 hrs
Red wine
6 hrs
Coffee
1 hr

PROCESS FOR PROVIDING LOW GLOSS COATINGS

CROSS-REFERENCE TO RELATED APPLICATION

This application is a national stage application under 35 U.S.C. § 371 of PCT/EP2023/063964, filed May 24, 2023, which claims the benefit of European Application Nos. 22175395.7 and 22175396.5, each filed May 25, 2022, each of which is incorporated herein by reference.

BACKGROUND

The present invention relates to the field of aqueous radiation-curable polyurethane coating compositions having a low gloss. The present invention also relates to a process for producing a low gloss coating from an aqueous radiation-curable coating composition.

Aqueous radiation-curable polyurethane dispersions (PUDs) are widely used to produce materials such as coatings, inks and/or adhesives. After applying the aqueous radiation-curable polyurethane dispersion on the substrate, the dispersion is dried affording an at least partially dried coating composition, and the at least partially dried coating composition is subsequently irradiated with UV light having a wavelength 300 nm or with E-beam, thereby obtaining a radiation cured coating. Such radiation cured coatings exhibit very good properties on numerous substrates like wood, plastic, concrete, metal, glass and/or textiles. The structure and functionality of the radiation-curable polyurethane dispersion is known to govern factors such as the speed of cure, the extent of crosslinking and the final properties of the coating (especially properties such as flexibility, hardness, adhesion, scratch resistance and/or chemical resistance).

"Low gloss" surfaces give products a much sought-after aesthetic effect, especially in the wood-furniture, flooring and wall covering industry, because they can create a very natural appearance that contribute to giving greater emphasis to the materiality of the article. At present, the creation of matte surfaces frequently involves the use of coating products the formulation of which contains matting agents made from organic and/or inorganic substances which, by positioning themselves on the coated surface and/or emerging on it, are able to act on the degree of reflection of light, giving the observer the visual sensation of a low gloss surface. However, the use of matting agents produces a worsening of the surface performance of the coating since, not being involved in the cross-linking and polymerization process, they lead to a significant reduction of stain resistance. Further there is a tendency for the matting agent to migrate to the coating surface after application and consequently the matting agent might get lost upon mechanical deformation, caused by for example scratch, resulting in an increase of gloss. The resistance to typical household chemicals, such as coffee, red wine and mustard, is also strongly reduced by the use of matting agents. Long-term action of these household chemicals leads at least to a reduction in quality of the coating and possibly even to its complete destruction. Silica based compounds are the majorly used matting agents. In general silica based matting agents are porous illustrated by its oil absorption values ranging from 100-500 mL/100 gr. The disadvantage of using this type of matting agent in coating formulations is that it not only deteriorates the quality of the final coating, but can also result in an undesired coloration of the exposed coating area, because especially colored household stains like coffee, red wine and mustard (part of DIN 1B) are easily absorbed by the porous silica and because these stains contain organic dyes, this can result in a undesired coloring of the exposed coating area.

DETAILED DESCRIPTION OF THE INVENTION

The object of the present invention is to provide a method for obtaining a low gloss coating from an aqueous radiation-curable polyurethane dispersion without having to use matting agent.

According to the invention there is provided a process for producing a coating, wherein the process comprises the steps in the sequence (1) to (4):

(1) applying an aqueous, radiation-curable coating composition on a surface of a substrate, (2) drying the aqueous, radiation-curable coating composition, affording an at least partially dried coating composition, (3) irradiating the at least partially dried coating composition with UV light having a wavelength s 220 nm under inert atmosphere, followed by (4) irradiating with UV light having a wavelength 300 nm or with E-beam, wherein the aqueous, radiation-curable coating composition is a dispersion comprising:

(A) at least one water-dispersible polyurethane (A), wherein the polyurethane (A) has a urea group (—NH—CO—NH—) concentration of at least 0.1 milli-equivalents per g of polyurethane (A) and of at most 2.6 milli-equivalents per g of polyurethane (A) and the polyurethane (A) is essentially free of radiation-curable, ethylenically unsaturated bonds, (B) at least one radiation-curable diluent (B) with a molar mass less than 750 g/mol and with an acrylate functionality of from 2 to 5, and (C) water and optionally organic solvent, whereby the optional organic solvent is present in an amount of at most 30 wt. %, based on the total amount of water and organic solvent, wherein the amount of (A) is from 30 to 85 wt. % and the amount of (B) is from 15 to 70 wt. %, based on the total amount of (A) and (B).

It has surprisingly been found that, without the use of matting agent, the method of the present invention, which method includes the pre-treatment of the coating composition with UV light with a wavelength s 220 nm (further also referred to as the excimer radiation step), makes it possible to obtain low gloss coatings from aqueous, radiation-curable polyurethane dispersions as defined herein and this while the water-dispersible polyurethane is essentially free of radiation-curable, ethylenically unsaturated bonds. More in particular with the process of the invention a coating can be obtained with a gloss measured at 20° geometry of angle lower than 10 gloss units and preferably with a gloss measured at 60° geometry of angle lower than 40 gloss units (further referred to as low gloss) and more preferably with a gloss measured at 60° geometry of angle lower than 30 gloss units. The aqueous, radiation-curable coating composition according to the invention allows to obtain a difference in gloss measured at $60^0$ geometry of angle with and without the excimer radiation step of at least 40 gloss units, preferably of at least 50 gloss units, more preferably of at least 60 gloss units. It has furthermore surprisingly been found that the method of the present invention makes it possible to obtain low gloss coatings from aqueous, radiation-curable polyurethane dispersions as defined herein, without the use of matting agents, while improving the coffee, red wine and/or mustard resistance of the coating compared to when the dispersions contain matting agent.

An additional advantage of the present invention is that handling of matting agents is not required, which is advantageous since matting agents have a large surface area and contain a large proportion of dust-forming small particles that may create exposure and explosion hazards. An additional advantage of not having to use matting agents for obtaining low gloss coatings is that coating compositions with less or no settling and thus improved storage stability can be achieved. An additional advantage of the method of the present invention is that coatings with a significantly higher smoothness can be obtained compared to when the coatings contained matting particles. An additional advantage of the method of the present invention is that coatings with a good intercoat adhesion to a subsequent coating can be obtained.

WO-A-2013/092521 describes a process for the production of homogeneous matted coatings on flat surfaces based on a so-called 100% radiation-curable coating compositions. In this method, first, the 100% radiation-curable coating composition, that contains a low molecular weight, radiation-curable oligomer as binder and optionally one or more reactive thinners to reduce the viscosity, is coated on the surface of a flat substrate with a spiral blade. This wet paint layer is subsequently irradiated with UV light with a wavelength of from 200 to 420 nm and a radiation dose of 25 to 120 $mJ/cm^2$ resulting in partial gelation of the coating composition. Then the so-obtained coating is irradiated with UV light from an Excimer lamp having a wavelength from 120 nm to 230 nm under inert gas, followed by finish curing using conventional UV emitters. A 100% radiation-curable coating composition refers to a coating composition having a solids content of 100 wt. %. 100% radiation-curable coating compositions are homogeneous systems having only one phase, while the aqueous, radiation-curable polyurethane coating compositions as defined herein are dispersions having at least two phases where one phase contains discrete particles (colloidally dispersed particles) distributed throughout an aqueous medium, the particles being the disperse phase and the aqueous medium the continuous phase. WO-A-2013/092521 does not teach that low gloss coatings could be obtained from aqueous coating compositions, let alone from aqueous, radiation-curable polyurethane dispersions as defined herein and is furthermore silent on stain resistances of the cured coating.

A further disadvantage of the method described in WO-A-2013/092521 is that the viscosity of 100% radiation-curable coating composition is usually high making some application techniques, such as spraying, for example, difficult or impossible to use to apply the coating composition to the substrate. Spraying applications can advantageously be used to apply coating composition on substrates with more complex shapes, such as for example furniture or decorative frames. The viscosity of 100% radiation-curable coating composition can be reduced by adding monofunctional diluents with low molecular weight, resulting in that a viscosity can be obtained that allows depositing the radiation-curable coating composition on a substrate by spraying. However, applying of 100% radiation-curable coating composition by spraying inherently results in a coating with high coating thickness.

An additional advantage of the use of aqueous, radiation-curable polyurethane dispersions as defined herein is that the viscosity can be steered by adjusting the solids with water, resulting in that with the process of the invention coatings can also easily be applied by spraying even in a low coating thickness such as for example 25 micron wet coating thickness.

An additional advantage of the fact that the aqueous, radiation-curable polyurethane dispersions as defined herein are more easily spray-applied is that the method of the invention also makes it possible to obtain low gloss coatings on more complex shaped articles such as, for example, a decorative frame with a more uniform degree of gloss of the coated article.

An additional advantage of the use of aqueous, radiation-curable coating composition as defined herein is that coatings with a lower thickness, such as for example a coating thickness of 50 micron or even less, can be rendered low gloss using the method of the invention. A further advantage of the invention is that the gloss level of the coating can be tuned with the residual water and/or organic solvent content that is present in the at least partially dried coating composition.

It has furthermore surprisingly been found that that with the coating composition as claimed a low gloss coating can be obtained in only 2 irradiation steps (i.e. step (3) and (4), in particular for coatings with a wet thickness (before drying) of at most 300 micron, or at most 250 micron, or at most 200 micron or at most 175 micron, in particular of at most 150 micron, more in particular of at most 125 micron, more in particular of at most 100 micron and more in particular of at most 75 micron. WO-A-2013/092521 teaches that an additional partial gelation irradiation step is needed prior to the excimer radiation step (step (3) of the process of the present invention) and the finish curing step (step (4) of the process of the present invention) and thus WO-A-2013/092521 teaches that three irradiation steps are needed to obtain a low gloss/matte coating with a homogeneous surface structure, see in particular Table 2.

The aqueous, radiation-curable coating composition used in the process of the invention is a dispersion comprising:

(A) at least one water-dispersible polyurethane (A), wherein the polyurethane (A) has a urea group (—NH—CO—NH—) concentration of at least 0.1 milli-equivalents per g of polyurethane (A) and of at most 2.6 milli-equivalents per g of polyurethane (A) and the polyurethane (A) is essentially free of radiation-curable, ethylenically unsaturated bonds, (B) at least one radiation-curable diluent (B) with a molar mass less than 750 g/mol and with an acrylate functionality of from 2 to 5, and (C) water and optionally organic solvent, whereby the optional organic solvent is present in an amount of at most 30 wt. %, based on the total amount of water and organic solvent, wherein the amount of (A) is from 30 to 85 wt. % and the amount of (B) is from 15 to 70 wt. %, based on the total amount of (A) and (B).

A dispersion refers to a system with at least two phases where one phase contains discrete particles (colloidally dispersed particles) distributed throughout a bulk substance, the particles being the disperse phase and the bulk substance the continuous phase. The continuous phase of an aqueous dispersion is provided at least in part by water. Preferably the continuous phase of the dispersion of the invention comprises at least 75 wt. %, more preferably at least 80 wt. % of water (relative to the continuous phase).

The aqueous coating composition used in the process of the invention is radiation-curable. By radiation-curable is meant that radiation is required to initiate crosslinking of the dispersion. The aqueous coating composition used in the process of the invention contains ethylenically unsaturated (C═C) bond functionality which under the influence of irradiation in combination with the presence of a (photo) initiator can undergo crosslinking by free radical polymerisation.

As used herein, the acrylate functionality of a compound is the number of acrylate functional groups per molecule of the compound.

An acrylate functional group has the following formula:

$$CH_2{=}CH{-}C(O)O^-$$

For all upper and/or lower boundaries of any range given herein, the boundary value is included in the range given, unless specifically indicated otherwise. Thus, when saying from x to y, means including x and y and also all intermediate values.

Water-Dispersible Polyurethane (a)

The aqueous, radiation-curable coating composition used in the process of the invention comprises polyurethane (A) in dispersed form, i.e. the composition comprises dispersed particles of the polyurethane (A).

The urea group (—NH—CO—NH—) concentration of the polyurethane (A) is at least 0.1 and at most 2.6 milli-equivalents per g of polyurethane (A). It has surprisingly been found that using polyurethane (A) with a urea bond concentration of higher than 2.6 milli-equivalents per g of polyurethane (A) in the process comprising the steps (1) to (4) does not result in low gloss coatings. The polyurethane (A) preferably has a urea group content of at most 2.3 milli-equivalents (meq) per g of (A), more preferably of at most 2.1 meq per g of (A), even more preferably of at most 1.9 meq per g of (A), even more preferably of at most 1.7 meq per g of (A), even more preferably of at most 1.5 meq per g of (A), most preferably of at most 1.3 meq per g of (A) and preferably of at least 0.2 meq per g of (A), more preferably of at least 0.3 meq per g of (A), even more preferably of at least 0.4 meq per g of (A). The urea group (—NH—CO—NH—) concentration of the polyurethane (A) is determined by calculation as further described herein.

Methods for preparing polyurethanes are known in the art and are described in for example the Polyurethane Handbook $2^{nd}$ Edition, a Carl Hanser publication, 1994, by G. Oertel. Usually an isocyanate-terminated polyurethane prepolymer is first formed which is then preferably chain extended with a nitrogen containing compound.

The polyurethane (A) is preferably prepared from the reaction of at least the following components, more preferably the polyurethane (A) is prepared from the reaction of the following components:

(A1) At least one polyisocyanate, (A2) At least one isocyanate-reactive compound that contains at least one salt group which is capable to render the polyurethane (A) dispersible in water and/or a functional group that can be converted into a salt group which is capable to render the polyurethane (A) dispersible in water, preferably acid functional, (A3) Optionally at least one isocyanate-reactive compound containing at least one non-ionic group which is capable to render the polyurethane (A) dispersible in water, (A4) At least one isocyanate-reactive polyol other than (A2) and (A3) having an OH number of from 25 to 225 mg KOH/g solids, (A5) Optionally at least one isocyanate-reactive polyol other than (A2) and (A3) having an OH number higher than 225 mg KOH/g solids and lower than 1850 mg KOH/g solids, and (A6) Water and/or at least one nitrogen containing chain extender compound.

A preferred isocyanate-reactive group is a hydroxyl group.

Component (A1)

At least one polyisocyanate is used as component (A1). The at least one polyisocyanate which is used according to the present invention is preferably selected from the group consisting of diisocyanates having the general formula Y(NCO)2, where Y is a C4-12 divalent aliphatic hydrocarbon group, i.e. an aliphatic diisocyanate compound, a C6-15 divalent alicyclic hydrocarbon group, i.e. an alicyclic diisocyanate compound, a C6-15 divalent aromatic hydrocarbon group, i.e. an aromatic diisocyanate compound, or a C7-15 divalent araliphatic hydrocarbon group, i.e. an araliphatic diisocyanate compound. Examples of suitable organic difunctional isocyanates (component (A1)) include ethylene diisocyanate, 1,5-pentamethylenediisocyanate, 1,6-hexamethylene diisocyanate (HDI), isophorone diisocyanate (IPDI), cyclohexane-1,4-diisocyanate, dicyclohexylmethane diisocyanate (HMDI) such as 4,4'-dicyclohexylmethane diisocyanate (4,4'-$H_{12}$ MDI), p-xylylene diisocyanate, p-tetramethylxylene diisocyanate (p-TMXDI) (and its meta isomer m-TMXDI), 1,4-phenylene diisocyanate, 2,4-toluene diisocyanate, 2,6-toluene diisocyanate, hydrogenated 2,4-toluene diisocyanate, hydrogenated 2,6-toluene diisocyanate, 4,4'-diphenylmethane diisocyanate (4,4'-MDI), 2,4'-diphenylmethane diisocyanate, 3(4)-isocyanatomethyl-1-methyl cyclohexyl isocyanate (IMCI) and 1,5-naphthylene diisocyanate. Preferred organic difunctional isocyanates are IPDI, HMDI and HDI. Mixtures of organic difunctional isocyanates can also be used.

In general, the amount of component (A1) is from 5 to 55 wt. %, preferably from 10 to 45 wt. %, most preferably from 15 to 40 wt. %, based on the weight of the polyurethane (A).

Component (A2)

At least one isocyanate-reactive compound that contains at least one salt group, preferably a salt of an acidic group, which is capable to render the polyurethane (A) dispersible in water and/or at least one functional group, preferably an acidic group, that can be converted, by reaction with a neutralizing agent, into a salt group which is capable to render the polyurethane (A) dispersible in water is used as component (A2).

In general, the amount of component (A2) is from 1 to 15 wt. %, preferably from 2 to 12 wt. % and even more preferably from 3 to 10 wt. %, based on the weight of the polyurethane (A).

According to the present invention, the acidic group is preferably selected from a carboxylic acid group, a sulfonic acid group and/or a phosphoric acid group. Component (A2) is preferably a compound having two or more hydroxy groups and/or two or more amino groups. Preferably at least one compound having two or more hydroxy groups is used as component (A2). A combination of at least one carboxylic acid group-containing compound and at least one sulfonic acid group-containing compound may be used.

Preferred components (A2) are dihydroxy alkanoic acids and diamine sulfonate salts.

Preferably, at least one carboxylic acid group containing compound is used as component (A2).

In case component (A2) contains at least one functional group that can be converted by reaction with a neutralizing agent into a salt group, the neutralizing agent used to deprotonate (neutralize) the functional groups (preferably carboxylic acid groups, sulfonic acid groups and/or phosphoric acid groups, more preferably carboxylic acid groups) is preferably selected from the group consisting of ammonia, a (tertiary) amine, a metal hydroxide and any mixture thereof. Suitable tertiary amines include triethylamine and N,N-dimethylethanolamine. Suitable metal hydroxides include alkali metal hydroxides, for example lithium hydroxide, sodium hydroxide and potassium hydroxide. Preferably, at least 30 mol %, more preferably at least 50 mol % and most preferably at least 70 mol % of the total molar amount of the neutralizing agent is alkali metal hydroxide, preferably selected from the group consisting of lithium hydroxide, sodium hydroxide, potassium hydroxide and any mixture thereof. Preferably the neutralizing agent used to deprotonate (neutralize) the carboxylic acid groups, sulfonic acid groups and/or phosphoric acid groups is an alkali metal hydroxide. As used herein, the neutralizing agent (if any) is not to be considered a component from which the building blocks of the polyurethane (A) are emanated. Thus, the amount of neutralizing agent (if any) used in the preparation of the polyurethane (A) is not taking into account for the calculation of the weight of the polyurethane (A).

In an embodiment of the invention, component (A2) comprises or essentially consists of or consists of at least one diamine sulfonate salt. In this embodiment, usually an isocyanate-terminated polyurethane pre-polymer is first formed by the reaction of components (A1) and (A4) and optionally (A3) and optionally (A5) which is then further reacted with the diamine sulfonate salt (A2) and water and optionally a nitrogen containing chain extender compound (A6). A preferred diamine sulfonate salt is the sodium salt of 2-[(2-aminoethyl)amino]ethanesulfonic acid.

In a preferred embodiment of the invention, component (A2) comprises or essentially consists of or consists of at least one dihydroxy alkanoic acid. In this embodiment, usually an isocyanate-terminated polyurethane pre-polymer is first formed by the reaction of components (A1), (A2) and (A4) and optionally (A3) and optionally (A5) which is then chain extended with water and/or a nitrogen-containing chain extender compound (A6).

Preferred dihydroxy alkanoic acids are α,α-dimethylolpropionic acid and/or α,α-dimethylolbutanoic acid. More preferably, the dihydroxy alkanoic acid(s) is α,α-dimethylolpropionic acid.

The amount of acidic groups present in the polyurethane (A) is preferably such that the acid value of the polyurethane (A) is in the range from 5 to 50, more preferably from 10 to 40, even more preferably from 15 to 30 mg KOH/g solids of the polyurethane (A). As used herein, the acid value is determined according to the following formula:

$$AV\text{[mgKOH/g solids]}=(\text{sum of acid groups present in the polyurethane } (A) \text{ (in moles)}/\text{total weight polyurethane } (A))*56.1*1000.$$

Component (A3)

Optionally at least one isocyanate-reactive compound containing at least one non-ionic group which is capable to render the polyurethane (A) dispersible in water, is used as component (A3).

The polyurethane (A) may further be stabilized in the dispersion through non-ionic functionality incorporated into the polyurethane (A). Thus, the polyurethane (A) may at least for a part be non-ionically stabilized by chemically incorporating non-ionic groups into the polyurethane (A) to provide at least a part of the hydrophilicity required to enable the polyurethane (A) to be stably dispersed in the aqueous dispersing medium. Preferred non-ionic water-dispersing groups are polyethylene oxide.

Preferred components (A3) are polyethylene glycols having at least 5 ethylene oxide repeating units, preferably at least 10, more preferably at least 15 ethylene oxide repeating units and preferably at most 120, more preferably at most 80 and even more preferably at most 40 ethylene oxide repeating units. More preferred components (A3) are polyethylene glycols having from 10 to 60 and preferably from 15 to 30 ethylene oxide repeating units.

Non-limited examples of suitable components (A3) include Ymer™ N120 available from Perstorp and MPEG 750.

In case component (A3) is used to prepare the polyurethane (A), the amount of component (A3) is in general from 1 to 15 wt. %, preferably from 1 to 12 wt. %, most preferably from 1 to 5 wt. %, based on the weight of the polyurethane (A).

Component (A4)

At least one isocyanate-reactive compound having an OH number of from 25 to 225 mg KOH/g solids and being different from (A2) and (A3) is used as component (A4). Preferred components (A4) are polyols which may be selected from any of the chemical classes of polyols that can be used in polyurethane synthesis. In particular the polyol may be a polyester polyol, a polyesteramide polyol, a polyether polyol, a polythioether polyol, a polycarbonate polyol, a polyacetal polyol, a polyvinyl polyol and/or a polysiloxane polyol.

Preferred are the polyester polyols, polyether polyols and polycarbonate polyols.

Preferably the OH number of component (A4) is within the range of from 35 to 190 mg KOH/g solids, more preferably within the range of from 45 to 125 mg KOH/g solids. The OH number is given by the supplier and can be measured by titration of a known mass of alcohol according to ASTM D4274 and is expressed as mg KOH/g.

In general, the amount of component (A4) is from 20 to 80 wt. %, preferably from 30 to 70 wt. %, more preferably from 35 to 65 wt. %, based on the weight of the polyurethane (A).

Component (A5)

Optionally at least one isocyanate-reactive compound having an OH number higher than 225 mg KOH/g solids and lower than 1850 mg KOH/g solids and being different from (A2) and (A3), is used as component (A5).

Examples of suitable components (A5) include neopentylglycol (NPG), cyclohexanedimethanol (CHDM), butanediol, hexanediol and trimethylolpropane.

In case component (A5) is used to prepare the polyurethane (A), the amount of component (A5) is in general from 0.5 to 10 wt. %, preferably from 1 to 8 wt. %, most preferably from 2 to 6 wt. %, based on the weight of the polyurethane (A).

Component (A6)

Water and/or at least one nitrogen containing chain extender compound is used as chain extender component (A6).

For water extension, two NCO groups will form one urea bond. First a NCO group reacts with water to form an unstable carbamic acid intermediate that decomposes to $CO_2$ and an amine group, which amine group will then react with another NCO group to form a urea group. However, water extension is very slow compared to chain extension using a nitrogen containing chain extender. Therefore, if a nitrogen containing chain extender compound is applied, it is assumed for the calculation of the urea group concentration that the isocyanate groups of the polyurethane prepolymer first react with the nitrogen containing chain extender and that during and/or after dispersion the isocyanate groups still present on the polyurethane prepolymer react with water to form a urea group.

Examples of suitable nitrogen containing chain extenders include amino-alcohols, primary or secondary diamines or polyamines (including compounds containing a primary amino group and a secondary amino group), hydrazine and substituted hydrazines. Examples of such chain extender compounds useful herein include 2-(methylamino)ethylamine, aminoethyl ethanolamine, aminoethylpiperazine, diethylene triamine, and alkylene diamines such as ethylene diamine and 1,6-hexamethylenediamine, and cyclic amines such as isophorone diamine. Also compounds such as hydrazine, azines such as acetone azine, substituted hydrazines such as, for example, dimethyl hydrazine, 1,6-hexamethylene-bis-hydrazine, carbodihydrazide, hydrazides of dicarboxylic acids, such as adipic acid dihydrazide, oxalic acid dihydrazide, and isophthalic acid dihydrazide, Hydrazides made by reacting lactones with hydrazine, bis-semi-carbazide, and bis-hydrazide carbonic esters of glycols may be useful. Water-soluble nitrogen containing chain extenders are preferred.

Preferably the nitrogen containing chain extender compound is selected from the group consisting of amino-alcohols, primary or secondary diamines, hydrazine, substituted hydrazines, substituted hydrazides and any mixture thereof.

Where the chain extender is other than water, for example, a hydrazine, it may be added to the aqueous dispersion of the isocyanate-terminated polyurethane prepolymer or, alternatively, it may already be present in the aqueous medium when the isocyanate-terminated polyurethane prepolymer is dispersed therein. The chain extension may be conducted at convenient temperatures from about 5° C. to 95° C. or, more preferably, from about 10° C. to 60° C.

The total amount of nitrogen containing chain extender compound employed, if used, should be such that the ratio of active hydrogens in the chain extender to isocyanate groups in the polyurethane prepolymer preferably is in the range from 0.1:1 to 2:1, more preferably from 0.6:1 to 1.4:1 and especially preferred from 0.8 to 1.2.

Preferably, component (A6) is water or water and at least one nitrogen containing chain extender with a $NH_x$ (wherein x is 1 or 2) functionality of 2 or 3, more preferably with a $NH_x$ functionality of 2, wherein for a hydrazide the NH groups connected to the carbonyl groups are not considered chain extending groups. More preferably, component (A6) comprises at least one nitrogen containing chain extender with a $NH_x$ (wherein x is 1 or 2) functionality of 2 or 3, more preferably with a $NH_x$ functionality of 2, wherein for a hydrazide the NH groups connected to the carbonyl groups are not considered chain extending groups. Even more preferably, component (A6) is water and at least one nitrogen containing chain extender with a $NH_x$ (wherein x is 1 or 2) functionality of 2 or 3, more preferably with a $NH_x$ functionality of 2, wherein for a hydrazide the NH groups connected to the carbonyl groups are not considered chain extending groups. The nitrogen containing chain extender is preferably selected from the group consisting of diamines and/or dihydrazides.

The radiation-curable ethylenically unsaturated bond concentration (also referred to as the C═C bond concentration) of the polyurethane (A) present in the aqueous, radiation-curable coating composition used in the present invention is less than 0.25 meq per g of polyurethane (A), preferably less than 0.2 milliequivalents per g of polyurethane (A), more preferably less than 0.1 milliequivalents per g of polyurethane (A), more preferably less than 0.05 milliequivalents per g of polyurethane (A), more preferably less than 0.01 milliequivalents per g of polyurethane As used herein, the amount of radiation-curable, ethylenically unsaturated bonds in the polyurethane (A) is determined by adding up all radiation-curable C═C functionality of the components from which the building blocks of the polyurethane (A) are emanated. As used herein, the expression per g of polyurethane (A) is determined by the total weight amount of components used to prepare the polyurethane from which the building blocks of the polyurethane are emanated. Most preferably, the polyurethane (A) does not contain radiation-curable ethylenically unsaturated bonds.

Radiation-Curable Diluent (B)

The aqueous, radiation-curable coating composition comprises at least one radiation-curable diluent (B) with a molar mass less than 750 g/mol and with an acrylate functionality of from 2 to 5. The molar mass of the radiation-curable diluents (B) is calculated from their corresponding molecular formulas indicating the numbers of each type of atom in the radiation-curable diluent. Thus, the molar mass of (B) is the calculated molar mass obtained by adding the atomic masses of all atoms present in the structural formula of the compound.

In a preferred embodiment of the invention, at least 10 wt. %, preferably at least 20 wt. %, more preferably at least 30 wt. % more preferably at least 40 wt. %, more preferably at least 50 wt. %, more preferably at least 60 wt. %, more preferably at least 70 wt. %, more preferably at least 80 wt. %, more preferably at least 90 wt. % and most preferably 100 wt. % of the radiation-curable diluents (B) is selected from the group consisting of:

di(trimethylolpropane) tetra-acrylate (di-TMPTA) with the corresponding molecular formula $C_{24}H_{34}O_9$ and its corresponding molar mass of 467 g/mol, di(trimethylolpropane) tri-acrylate (di-TMP3A) with the corresponding molecular formula $C_{21}H_{32}O_8$ and its corresponding molar mass of 412 g/mol, di(trimethylolpropane) tri-acrylate comprising alkoxy groups, glyceryl propoxy triacrylate (GPTA) with the corresponding molecular formula $C_{21}H_{32}O_9$ and its corresponding molar mass of 428 g/mol, glyceryl propoxy triacrylate comprising additional alkoxy groups, pentaerythritol tetra-acrylate (PET4A) with the corresponding molecular formula $C_{17}H_{20}O_8$ and its corresponding molar mass of 352 g/mol, pentaerythritol tetra-acrylate comprising alkoxy groups, pentaerythritol tri-acrylate (PET3A) with the corresponding molecular formula $C_{14}H_{18}O_7$ and its corresponding molar mass of 298 g/mol, pentaerythritol tri-acrylate comprising alkoxy groups, trimethylolpropane triacrylate (TMPTA) with the corresponding molecular formula $C_{15}H_{20}O_6$ and its corresponding molar mass of 296 g/mol, trimethylolpropane triacrylate comprising alkoxy groups, dipropyleneglycol diacrylate (DPGDA) with the corresponding molecular formula $C_{12}H_{18}O_5$ and its corresponding molar mass of 242 g/mol, dipropyleneglycol diacrylate comprising additional alkoxy groups, and any mixture thereof.

In case radiation-curable diluent (B) comprises (additional) alkoxy groups, the maximum number of alkoxy groups is such that the molar mass remains lower than 750 g/mol.

In a more preferred embodiment of the invention, at least 10 wt. %, preferably at least 20 wt. %, more preferably at least 30 wt. % more preferably at least 40 wt. %, most preferably at least 50 wt. %, more preferably at least 60 wt. %, more preferably at least 70 wt. %, more preferably at least 80 wt. %, more preferably at least 90 wt. % and most preferably 100 wt. % of the radiation-curable diluents (B) is selected from the group consisting of:

di(trimethylolpropane) tetra-acrylate (di-TMPTA) with the corresponding molecular formula $C_{24}H_{34}O_9$ and its corresponding molar mass of 467 g/mol, di(trimethylolpropane) tri-acrylate (di-TMP3A) with the corresponding molecular formula $C_{21}H_{32}O_8$ and its corresponding molar mass of 412 g/mol, di(trimethylolpropane) tri-acrylate comprising alkoxy groups, glyceryl propoxy triacrylate (GPTA) with the corresponding molecular formula $C_{21}H_{32}O_9$ and its corresponding molar mass of 428 g/mol, glyceryl propoxy triacrylate comprising additional alkoxy groups, trimethylolpropane triacrylate (TMPTA) with the corresponding molecular formula $C_{15}H_{20}O_6$ and its corresponding molar mass of 296 g/mol, trimethylolpropane triacrylate comprising alkoxy groups, dipropyleneglycol diacrylate (DPGDA) with the corresponding molecular formula $C_{12}H_{18}O_5$ and its corresponding molar mass of 242 g/mol, dipropyleneglycol diacrylate (DPGDA) comprising additional alkoxy groups, and any mixture thereof.

Preferably, at least one of the radiation-curable diluents (B) has an acrylate functionality of 2 or 3, as this advantageously may result in a more pronounced matting effect. The radiation-curable diluents (B) with an acrylate functionality of 2 are preferably selected from the group consisting of dipropyleneglycol diacrylate (DPGDA) (with the corresponding molecular formula $C_{12}H_{18}O_5$ and its corresponding molar mass of 242 g/mol); dipropyleneglycol diacrylate comprising additional alkoxy groups, preferably propoxy groups; and any mixture thereof.

The radiation-curable diluents (B) with an acrylate functionality of 3 are preferably selected from the group consisting of glyceryl propoxy triacrylate (GPTA) (with the corresponding molecular formula $C_{21}H_{32}O_9$ and its corresponding molar mass of 428 g/mol); glyceryl propoxy triacrylate comprising additional alkoxy groups, preferably propoxy groups; trimethylolpropane triacrylate (TMPTA) (with the corresponding molecular formula $C_{15}H_{20}O_6$ and its corresponding molar mass of 296 g/mol);

trimethylolpropane triacrylate comprising alkoxy groups, preferably propoxy groups;

di(trimethylolpropane) tri-acrylate (di-TMP3A) with the corresponding molecular formula $C_{21}H_{32}O_8$ and its corresponding molar mass of 412 g/mol, di(trimethylolpropane) tri-acrylate comprising alkoxy groups, preferably propoxy groups; pentaerythritol tri-acrylate (PET3A) (with the corresponding molecular formula $C_{14}H_{18}O_7$ and its corresponding molar mass of 298 g/mol); pentaerythritol tri-acrylate comprising alkoxy groups, preferably propoxy groups; and any mixture thereof. The radiation-curable diluents (B) with an acrylate functionality of 2 or 3 preferably comprises alkoxy groups, preferably propoxy groups ($—C_3H_6O—$).

Preferably, the composition further comprises at least one of the radiation-curable diluents (B) with an acrylate functionality of 4 or 5, as this advantageously may result in further improved chemical resistances. The radiation-curable diluents (B) with an acrylate functionality of 4 are preferably selected from the group consisting of di(trimethylolpropane) tetra-acrylate (di-TMPTA) (with the corresponding molecular formula $C_{24}H_{34}O_9$ and its corresponding molar mass of 467 g/mol); pentaerythritol tetra-acrylate (PET4A) (with the corresponding molecular formula $C_{17}H_{20}O_8$ and its corresponding molar mass of 352 g/mol); pentaerythritol tetra-acrylate comprising alkoxy groups, preferably propoxy groups; and any mixture thereof.

The radiation-curable diluents (B) with an acrylate functionality of 5 is preferably dipentaerythritol penta-acrylate (DPPA) with the corresponding molecular formula $C_{25}H_{32}O_{12}$ and its corresponding molar mass of 525 g/mol.

In a preferred embodiment, the aqueous, radiation-curable coating composition used in the process of the present invention comprises at least two radiation-curable diluents (B) and the radiation-curable diluents (B) present in the aqueous, radiation-curable coating composition have an average acrylate functionality according to formula $$\bar{f} = \frac{\sum_k \frac{w_k}{M_k} f_k}{\sum_k \frac{w_k}{M_k}}$$

of from 2 to 4, preferably from 2 to 3, in which $w_k$ is the amount of acrylate diluents (B) in g present in the aqueous, radiation-curable coating composition with a molar mass $M_k$ and with an acrylate functionality $f_k$ Preferably, the aqueous, radiation-curable coating composition used in the process of the present comprises monofunctional diluent in an amount less than 7 wt. %, more preferably at less than 5 wt. %, more preferably less than 3 wt. % and more preferably less than 1 wt. %, and especially preferred less than 0.5 wt. %, relative to the weight of the entire aqueous, radiation-curable coating composition The aqueous, radiation-curable coating composition used in the process may also comprise acrylate diluents with a molar mass as defined for the (B) compounds present in the radiation-curable coating composition (i.e. lower than 750 g/mol) but with a different acrylate functionality than defined for (B), for example with an acrylate functionality of 6. However, such acrylate diluents may only be present in the aqueous radiation-curable coating composition in such an amount that the average acrylate functionality of the acrylate diluents with a molar mass as defined for (B) (i.e. lower than 750 g/mol) is in the range of preferably from 2 to 5, more preferably from 2 to 4, even more preferably from 2 to 3.

Preferably, the aqueous, radiation-curable coating composition used in the process of the present comprises monofunctional diluent in an amount less than 7 wt. %, more preferably at less than 5 wt. %, more preferably less than 3 wt. %, more preferably less than 1 wt. %, most preferably less than 0.5 wt. %, relative to the weight of the entire aqueous, radiation-curable coating composition.

In an even more preferred embodiment of the invention, at least 10 wt. %, preferably at least 20 wt. %, more preferably at least 30 wt. % more preferably at least 40 wt. %, most preferably at least 50 wt. %, more preferably at least 60 wt. %, more preferably at least 70 wt. %, more preferably at least 80 wt. %, more preferably at least 90 wt. % and most preferably 100 wt. % of the radiation-curable diluents (B) is a mixture of (1) di(trimethylolpropane) tetra-acrylate (di-TMPTA) and/or pentaerythritol tetra-acrylate (PET4A) with the corresponding molecular formula $C_{17}H_{20}O_8$ and its corresponding molar mass of 352 g/mol and/or pentaerythritol tetra-acrylate comprising alkoxy groups, and (2) glyceryl propoxy triacrylate (GPTA) and/or glyceryl propoxy triacrylate comprising additional alkoxy groups, preferably propoxy groups and/or dipropyleneglycol diacrylate (DPGDA) and/or dipropyleneglycol diacrylate comprising additional alkoxy groups, preferably propoxy groups.

In the present invention, the water-dispersible polyurethanes (A) and the radiation-curable diluents (B) together preferably have a weight-average molecular weight $M_w$ of at least 15,000 g/mol, more preferably of at least 20,000 g/mol, even more preferably of at least 30,000 g/mol and can be even higher than the highest weight-average molecular weight that can be measured with the method as used herein for determining the weight-average molecular weight. The water-dispersible polyurethanes (A) and the radiation-curable diluents (B) together preferably have a z-average molecular weight $M_z$ of of at least 25,000 g/mol, preferably of at least 40,000 g/mol, more preferably of at least 60,000 g/mol, more preferably of at least 110,000 g/mol and can be even higher than the highest z-average molecular weight that can be measured with the method as used herein for determining the weight-average molecular weight. The weight average molecular weight $M_w$ and z-average molecular weight $M_z$ are determined as described further herein.

The amounts of (A) and (B) in the aqueous, radiation-curable coating composition can vary within wide ranges as water and optional organic solvent can be used to adopt the viscosity and to tune the layer thickness of the applied coating. Preferably, the amount of (A) is from 35 to 80 wt. % and the amount of (B) is from 20 to 65 wt. %, more preferably the amount of (A) is from 40 to 80 wt. % and the amount of (B) is from 20 to 60 wt. %, based on the total amount of (A) and (B).

The summed amount of (A) and (B) is preferably from 10 to 60 wt. %, more preferably from 15 to 50 wt. %, more preferably from 15 to 45 wt. %, even more preferably from 20 to 40 wt. %, even more preferably from 25 to 35 wt. %, based on the entire weight of the aqueous, radiation-curable coating composition.

The optional organic solvent is present in an amount of at most 30 wt. %, preferably at most 25 wt. %, more preferably at most 20 wt. %, more preferably in an amount of at most 15 wt. %, more preferably in an amount of at most 10 wt. %, more preferably in an amount of at most 5 wt. %, more preferably in an amount of at most 1 wt. %, wherein the amount of organic solvent is given based on the total amount of water and organic solvent present in the aqueous, radiation-curable coating composition. Suitable organic solvents are solvents which are inert in respect of the functional groups present in the coating composition. Suitable solvents are for example hydrocarbons, alcohols, ketones and esters, such as co-solvents also having the function of coalescent such as 1-methyl-2-pyrrolidinone, glycols and glycol ethers such as butyldiglycol, dipropylene glycol methyl ether, acetone, methyl ethyl ketone and alkyl ethers of glycol acetates or mixtures thereof. Most preferably the aqueous, radiation-curable coating composition is essentially free of organic solvent, i.e. organic solvent is preferably not deliberately be added (i.e. small amounts of organic solvent may be present in the additives used to prepare the composition) to the aqueous, radiation-curable coating composition.

The total amount of biobased carbon content in (A) and (B), relative to the total mass of carbon in (A) and (B), measured according to standard ASTM D6866-12, Method B, is preferably at least 5 wt. %, more preferably at least 10 wt. %, more preferably at least 20 wt. %, more preferably at least 30 wt. %, most preferably at least 40 wt. %, relative to the entire weight of (A) and (B).

The viscosity of the dispersion consisting of (A), (B) and (C) and containing from 10 to 60 wt. % of (A) and (B), relative to the total amount of (A), (B) and (C), is preferably from 10 to 1000 mPa·s, or from 10 to 800 mPa·s, or from 10 to 500 mPa·s. The viscosity is determined as further described herein.

The z-average particle size of the dispersion consisting of (A), (B) and (C) is preferably from 20 to 1000 nm, more preferably from 25 to 500 nm, even more preferably from 25 to 250 nm and most preferably from 30 to 200 nm, whereby the z-average particle size is determined as further described herein.

The aqueous, radiation-curable coating composition used in the process of the invention is preferably essentially free of tin and/or essentially free of tertiary amines. As used herein, essentially free of tin means that the radiation-curable coating composition contains tin in amount of preferably at most 50 ppm (relative to the aqueous, radiation-curable coating composition), more preferably at most 10 ppm, even more preferably at most 5 ppm, even more preferably at most 2 ppm and even more preferably the aqueous, radiation-curable coating composition used in the process of the invention does not contain tin. As used herein, essentially free of tertiary amines means that the radiation-curable coating composition contains tertiary amines like for example triethylamine in an amount of preferably at most 1.5 wt. % (relative to the aqueous, radiation-curable coating composition), more preferably at most 1 wt. %, even more preferably at most 0.5 wt. %, even more preferably at most 0.1 wt. % and even more preferably the aqueous, radiation-curable coating composition used in the process of the invention does not contain tertiary amine(s).

The coating composition usually further contains an additive compound; that is, a collection of one or more than one individual additives having one or more than one specified structure or type. Suitable additives are for example light stabilizers, such as UV absorbers and reversible free-radical scavengers (HALS), photosensitizers, antioxidants, degassing agents, wetting agents, emulsifiers, slip additives, waxes, polymerisation inhibitors, adhesion promoters, flow control agents, film-forming agents, rheological aids such as thickeners, flame retardants, corrosion inhibitors, waxes, driers and biocides. One or more of the aforementioned additives can be employed in the coating composition used in the process of the present invention in any suitable amount and may be chosen singly or in combination of one or more of the types enumerated herein. In a preferred embodiment, the additive compound is present in an amount, relative to the entire weight of the coating composition, of from about 0 wt. % to 40 wt. %, or from 0 wt. % to 30 wt. %, or from 0 wt. % to 20 wt. %, or from 0 wt. % to 10 wt. %, or from 0 wt. % to 5 wt. %; or from 0.01 wt. % to 40 wt. %; or from 0.01 wt. % to 30 wt. %, or from 0.01 wt. % to 20 wt. %, or from 0.01 wt. % to 10 wt. %, or from 0.01 wt. % to 5 wt. %, or from 0.1 wt. % to 2 wt. %. According to another embodiment, the additive compound is present, relative to the weight of the entire radiation curable composition, from 1 wt. % to 40 wt. %, or from 1 wt. % to 30 wt. %, or from 1 wt. % to 20 wt. %, or from 1 wt. % to 10 wt. %, or from 1 wt. % to 5 wt. %. An additional advantage of the present invention is that the coating composition can also be pigmented, while this does not significantly complicate the application of the coating composition on the substrate. The coating composition then contain at least one pigment. In the art titanium dioxide ($TiO_2$) is considered as a commercially important white pigment. Despite the porous nature of this type of pigment, it has furthermore surprisingly been found that the presence of such type of pigments in the coating composition as defined herein, hardly impair the coffee, red wine and/or mustard resistance of the coating or only deteriorates to such an extent that the resistance to coffee, red wine and/or mustard remains at an acceptable level.

The coating composition can also contain one or more inorganic fillers. The coating composition can also contain external matting agents which have an additional matting effect, although this is not preferred. Suitable external matting agents are for example inorganic silica or organic waxes. The maximum amount of external matting agents is preferably at most 1.5 wt. %, more preferably at most 1 wt. % and most preferably at most 0.5 wt. %, relative to the entire weight of the coating composition.

The present invention further relates to a process for preparing the aqueous, radiation-curable coating composition used in the process of the present invention.

The process for preparing the aqueous, radiation-curable coating composition used in the process of the present invention comprises preparing an aqueous, radiation-curable dispersion comprising particles of the polyurethane (A), whereby at least a part of the radiation-curable diluent (B) can be present during preparation of said dispersion and/or at least a part of the radiation-curable diluent (B) can be added after the preparation of said dispersion.

In the preferred embodiment of the invention in which component (A2) comprises or essentially consists of or consists of at least one dihydroxy alkanoic acid, the process for preparing the aqueous, radiation-curable coating composition comprises water-dispersible polyurethane (A) preferably comprises I. reacting components (A1), (A2) and (A4) and optionally (A3) and optionally (A5) to obtain a polyurethane pre-polymer, II. (a) either blending the polyurethane pre-polymer with an aqueous phase comprising neutralizing agent and preferably comprising nitrogen containing chain extender compound compound (A6) to obtain a dispersion or (b.1) either neutralizing the polyurethane pre-polymer by adding neutralizing agent to the polyurethane pre-polymer and subsequently (b.2) adding the neutralized polyurethane prepolymer to water preferably comprising nitrogen containing chain extender compound (A6) to obtain a dispersion or (b.2') adding water preferably comprising nitrogen containing chain extender compound (A6) to the neutralized polyurethane prepolymer to obtain a dispersion or (b.2") adding the neutralized polyurethane prepolymer to water to obtain a dispersion and afterwards add the nitrogen containing chain extender compound (A6) to the dispersion, whereby the step I may be effected in the presence of at least a part of the radiation-curable diluent (B); and/or at least a part of the radiation-curable diluent (B) may be added after step I, and prior to step II.(a) or prior to and/or after step II.(b.1) and/or at least a part of the radiation-curable diluent (B) may be added after step II.(a) or after step II.(b.2) or after step II.(b.2'). Thus step I can also be effected in the absence of radiation-curable diluent (B). Any step of the foregoing can be carried out in the presence of a temporary solvent like acetone or MEK which is removed from the aqueous polyurethane (A) dispersion.

In the preferred embodiment of the invention in which component (A2) comprises or essentially consists of or consists of at least one diamine sulfonate salt, the process for preparing the aqueous, radiation-curable coating composition comprises water-dispersible polyurethane (A) preferably comprises I. reacting components (A1), (A4), and optionally (A3) and optionally (A5) to obtain a polyurethane pre-polymer, II. (II.1) adding the polyurethane prepolymer to water comprising diamine sulfonate salt (A2) and preferably comprising nitrogen containing chain extender compound (A6) to obtain a dispersion or (II.1') adding water comprising diamine sulfonate salt (A2) and preferably comprising nitrogen containing chain extender compound (A6) and optionally further adding water to the polyurethane prepolymer to obtain a dispersion, whereby step I may be effected in the presence of at least a part of the radiation-curable diluent (B); and/or at least a part of the radiation-curable diluent (B) may be added after step I and prior to step II and/or at least a part of the radiation-curable diluent (B) may be added after step II. Thus step I can also be effected in the absence of radiation-curable diluent (B).

In case step I is effected in the presence of radiation-curable diluent (B), the amount of radiation-curable diluent (B) that comprises isocyanate reactive groups is chosen such that the ethylenically unsaturated bond concentration of the polyurethane (A) is less than 0.25 meq per g of polyurethane (A), preferably less than 0.2 milliequivalents per g of polyurethane (A), more preferably less than 0.1 milliequivalents per g of polyurethane (A), more preferably less than 0.05 milliequivalents per g of polyurethane (A), more preferably less than 0.01 milliequivalents per g of polyurethane (A) and most preferably such that the polyurethane (A) does not contain radiation-curable vinylic bonds. In case step I is effected in the presence of radiation-curable diluent (B), said radiation-curable diluent is preferably chosen from glyceryl propoxy triacrylate, dipropyleneglycol diacrylate, trimethylolpropane triacrylate, alkoxylated versions of any of the foregoing, and any mixture thereof. Any step of the foregoing can be carried out in the presence of a temporary solvent like acetone or MEK which is removed from the aqueous polyurethane (A) dispersion.

The process of the invention optionally comprises a pre-curing step (2a). Performing the pre-curing step (2a) may be advantageous for improving adhesion, in particular for improving intercoat adhesion. In this optional step (2a) pre-curing of the at least partially dried coating composition is effected, affording an at least partially cured coating composition. In optional step (2a) some of the reactive ethylenically unsaturated double bonds of the curable compounds polymerize in the uncured coating layer, so that the coating layer partially cures but is not yet fully cured. This process is also known as pre-curing.

Accordingly, the process of the invention comprises the steps in the sequence (1), (2), (2a), (3), (4) and (5):

(1) Applying an aqueous, radiation-curable coating composition on a surface of a substrate, (2) Drying the aqueous, radiation-curable coating composition, affording an at least partially dried coating composition, (2a) Optionally pre-curing the at least partially dried coating composition by irradiating the at least partially dried coating composition with UV light having a wavelength of from 300 to 450 nm, preferably from 300 to 420 nm with a radiation dose which results in partial curing of the layer, preferably with a radiation dose from 20 to 200 $mJ/cm^2$, more preferably with a radiation dose from 30 to 100 $mJ/cm^2$, affording an at least partially cured coating composition, (3) Irradiating the at least partially dried coating composition or the at least partially cured coating composition with UV light having a wavelength ≤220 nm preferably with a wavelength ≥120 nm, more preferably ≥150 nm, particularly preferably 172 nm or 195 nm, under inert atmosphere, followed by (4) Irradiating with UV light having a wavelength 300 nm or with E-beam.

In step (1) of the process of the invention, the aqueous, radiation-curable coating composition is applied to a substrate by methods known to the person skilled in the art, such as for example knife coating, brushing, roller coating, spraying. The coating composition is applied to the substrate in a coating thickness (before drying) of preferably from 5 to 300 micron, more preferably from 15 to 175 micron, more preferably from 20 to 150 micron, more preferably from 25 to 125 micron.

In step (2) of the process of the invention, drying of the aqueous, radiation-curable coating composition that is applied to the substrate is in general effected at a temperature higher than 30° C. to evaporate water and optionally organic solvent and other volatile compounds, affording an at least partially dried coating composition. The term "drying" refers to the loss of water and, if present, organic solvent and other volatile compounds such as for example neutralizing amines, from the aqueous coating composition by evaporation to such extend that preferably at least 80 wt. % of the water is removed.

The irradiating in the optional pre-curing step (2a) preferably takes place under atmospheric conditions, in other words not under inert gas conditions and/or not in an oxygen-reduced atmosphere. UV-A-emitting radiation sources (e.g. fluorescent tubes, LED lamps), high- or medium-pressure mercury vapour lamps, wherein the mercury vapour can be modified by doping with other elements such as gallium or iron, pulsed lamps (known as UV flash lamps) or halogen lamps are suitable as radiation sources for UV light in the specified wavelength range in step (2a). In a preferred embodiment of the invention, the process is performed without step (2a), i.e., the curing of the radiation-curable coating composition is effected in only 2 irradiation steps (i.e. step (3) and (4)).

Suitable radiation sources for step (3) are excimer UV lamps, which emit UV light with a wavelength s 220 nm and preferably with a wavelength 120 nm, more preferably 150 nm, particularly preferably 172 nm or 195 nm. The radiation dose used in step (3) is usually in the range from 0.1 to 150 $mJ/cm^2$, preferably in the range of from 1 to 100 $mJ/cm^2$, more preferably from 1 to 20 $mJ/cm^2$, more preferably from 2 to 15 $mJ/cm^2$. For improving the intercoat adhesion to a subsequent coating, the radiation dose used in step (3) is preferably from 2 to 10 $mJ/cm^2$, more preferably from 2 to 8 $mJ/cm^2$, even more preferably from 2.5 to 6 $mJ/cm^2$. Step (3) must be performed in an inert gas atmosphere.

An inert gas atmosphere is understood to mean an essentially oxygen-free atmosphere, i.e. an atmosphere which contains less than 0.5 percent by volume of oxygen, preferably less than 0.1 percent by volume of oxygen and especially preferably less than 0.05 percent by volume of oxygen. As a rule, an inert gas atmosphere is achieved by flushing the area which is exposed to the UV radiation with a stream of inert gas. The inert gas atmosphere prevents undesired ozone formation on the one hand and prevents the polymerization of the lacquer layer from being inhibited on the other hand. Examples of inert gases are nitrogen, carbon dioxide, combustion gases, helium, neon or argon. Nitrogen is particularly preferably used. This nitrogen should only contain very small amounts of foreign gases such as oxygen, preferably with a purity grade of <300 ppm oxygen.

In step (4) of the process of the present invention, the coating layer obtained in step (3) is irradiated with UV light having a wavelength (higher than or equal to) 300 nm or with E-beam to achieve that the radiation-curable compounds of the coating composition largely or preferably completely polymerizes, so that the coating layer is preferably fully cured. In case E-beam irradiation (150 to 300 kV) is applied in step (4), usually a dose of 10 to 100 kGy, preferably 20 to 50 kGy, is applied. In step (4) UV irradiation is preferred, preferably with a wavelength of from 300 to 420 nm and preferably with a radiation dose of from 100 to 2000 $mJ/cm^2$, more preferably from 150 to 1500 $mJ/cm^2$. High- and medium-pressure mercury vapour lamps can in particular be used as UV radiation sources, wherein the mercury vapour can be doped with further elements such as gallium or iron. Step (4) can optionally also be performed in an inert gas atmosphere. In case UV irradiation is applied in step (4), the radiation-curable coating composition comprises a photo-initiator. If the radiation curable coating composition used in the process of the invention comprise one or more photo-initiators, they are included in an amount sufficient to obtain the desired cure response. Typically, the one or more photo-initiators are included in amounts in a range of from 0.1 to 5% by weight of the entire coating composition. Preferably, the one or more photo-initiators are present in an amount, relative to the entire weight of the coating composition, of from 0.25 wt. % to 4 wt. %, more preferably from 0.5 wt. % to 3.5 wt. % and even more preferably from 0.5 wt. % to 3 wt. %.

A photoinitiator is a compound that chemically changes due to the action of light or the synergy between the action of light and the electronic excitation of a sensitizing dye to produce at least one of a radical, an acid, and a base. Well-known types of photoinitiators include cationic photoinitiators and free-radical photoinitiators. According to an embodiment of the present invention, the photoinitiator is a free-radical photoinitiator.

In an embodiment, the photoinitiator compound includes, consists of, or consists essentially of one or more acylphosphine oxide photoinitiators. Acylphosphine oxide photoinitiators are known, and are disclosed in, for example, U.S. Pat. Nos. 4,324,744, 4,737,593, 5,942,290, 5,534,559, 6,020,529, 6,486,228, and 6,486,226. Preferred types of acylphosphine oxide photoinitiators for use in the photoinitiator compound include bisacylphosphine oxides (BAPO) or monoacylphosphine oxides (MAPO). More specifically, examples include 2,4,6-trimethylbenzoylethoxyphenylphosphine oxide (CAS #84434-11-7) or 2,4,6-trimethylbenzoyl-diphenylphosphine oxide (CAS #127090-72-6).

In a preferred embodiment, the photoinitiator compound may also optionally comprise, consist of, or consist essentially of α-hydroxy ketone photoinitiators. For instance, suitable α-hydroxy ketone photoinitiators are α-hydroxycyclohexyl phenyl ketone, 2-hydroxy-2-methyl-1-phenylpropanone, 2-hydroxy-2-methyl-1-(4-isopropylphenyl)propanone, 2-hydroxy-2-methyl-1-(4-dodecylphenyl) propanone, 2-Hydroxy-1-{4-[4-(2-hydroxy-2-methyl-propionyl)-benzyl]-phenyl}-2-methyl-propan-1-one and 2-hydroxy-2-methyl-1-[(2-hydroxyethoxy)phenyl]propanone.

In another embodiment, the photoinitiator compound includes, consists of, or consists essentially of: α-aminoketones, such as 2-methyl-1-[4-(methylthio)phenyl]-2-(4-morpholinyl)-1-propanone, 2-benzyl-2-(dimethylamino)-1-[4-(4-morpholinyl)phenyl]-1-butanone, 2-(4-methylbenzyl-2-(dimethylamino)-1-[4-(4-morpholinyl)phenyl]-1-butanone or 2-benzyl-2-(dimethylamino)-1-[3,4-dimethoxyphenyl]-1-butanone; benzophenones, such as benzophenone, 2,4,6-trimethylbenzophenone, 4-methylbenzophenone, 2-methylbenzophenone, 2-methoxycarbonylbenzophenone, 4,4'-bis (chloromethyl)-benzophenone, 4-chlorobenzophenone, 4-phenylbenzophenone, 4,4'-bis(dimethylamino)-benzophenone, 4,4'-bis(diethylamino)benzophenone, methyl2-benzoylbenzoate, 3,3'-dimethyl-4-methoxybenzophenone, 4-(4-methylphenylthio)benzophenone, 2,4,6-trimethyl-4'-phenyl-benzophenone or 3-methyl-4'-phenyl-benzophenone; ketal compounds, for example 2,2-dimethoxy-1,2-diphenyl-ethanone; and monomeric or dimeric phenylglyoxylic acid esters, such as methylphenylglyoxylic acid ester, 5,5'-oxo-di(ethyleneoxydicarbonylphenyl) or 1,2-(benzoylcarboxy)ethane.

Yet further suitable photoinitiators for use in the photoinitiator compound include oxime esters, such as those disclosed in U.S. Pat. No. 6,596,445. Still another class of suitable photoinitiators for use in the photoinitiator compound include, for example, phenyl glyoxalates, for example those disclosed in U.S. Pat. No. 6,048,660.

In another embodiment, the photoinitiator compound may comprise, consist of, or consist essentially of one or more alkyl-, aryl-, or acyl-substituted compounds not mentioned above herein.

According to another embodiment, the composition may contain a photoinitiator that is an alkyl-, aryl-, or acyl-substituted compound. In an embodiment the alkyl-, aryl-, or acyl-substituted photoinitiator possesses or is centered around an atom in the Carbon (Group 14) group. In such instance, upon excitation (via absorption of radiation) the Group 14 atom present in the photoinitiator compound forms a radical. Such compound may therefore produce a radical possessing or centered upon an atom selected from the group consisting of silicon, germanium, tin, and lead. In an embodiment, the alkyl-, aryl-, or acyl-substituted photoinitiator is an acylgermanium compound. Such photoinitiators are described in, U.S. Pat. No. 9,708,442, assigned to DSM IP Assets B.V. Known specific acylgermanium photoinitiators include benzoyl trimethyl germane (BTG), tetracylgermanium, or bis acyl germanoyl (commercially available as Ivocerin® from Ivoclar Vivadent AG, 9494 Schaan/Liechtenstein).

Photoinitiators may be employed singularly or in combination of one or more as a blend. Suitable photoinitiator blends are for example disclosed in U.S. Pat. No. 6,020,528 and U.S. Pat. app. No. 60/498,848. According to an embodiment, the photoinitiator compound includes a photoinitiator blend of, for example, bis(2,4,6-trimethylbenzoyl) phenyl phosphine oxide (CAS #162881-26-7) and 2,4,6,-trimethylbenzoylethoxyphenylphosphine oxide (CAS #84434-11-7) in ratios by weight of about 1:11, 1:10, 1:9, 1:8 or 1:7.

Another especially suitable photoinitiator blend is a mixture of bis(2,4,6-trimethylbenzoyl)phenyl phosphine oxide, 2,4,6,-trimethylbenzoylethoxyphenylphosphine oxide and 2-hydroxy-2-methyl-1-phenyl-1-propanone (CAS #7473-98-5) in weight ratios of for instance about 3:1:15 or 3:1:16 or 4:1:15 or 4:1:16. Another suitable photoinitiator blend is a mixture of bis(2,4,6-trimethylbenzoyl)phenyl phosphine oxide and 2-hydroxy-2-methyl-1-phenyl-1-propanone in weight ratios of for instance about 1:3, 1:4 or 1:5.

One or more of the aforementioned photoinitiators can be employed for use in the photoinitiator compound in compositions used in the process according to the present invention in any suitable amount and may be chosen singly or in combination of one or more of the types enumerated herein. In a preferred embodiment, the photoinitiator compound comprises, consists of, or consists essentially of free-radical photoinitiators, preferably of the α-cleavage type.

Suitable substrates for the process according to the invention are for example mineral substrates such as fiber cement board, wood, wood containing materials, paper including cardboard, textile, leather, metal, thermoplastic polymer, thermosets, ceramic, glass.

Suitable thermoplastic polymers are for example polyvinylchloride PVC, polymethylmethacrylate PMMA, acrylonitrile-butadiene-styrene ABS, polycarbonate, polypropylene PP, polyethylene PE, polyamide PA and polystyrene. Suitable thermosets are for example linoleum, epoxy, melamine, novolac, polyesters and urea-formaldehyde.

The substrate is optionally pre-treated and/or optionally pre-coated. For example, thermoplastic plastic films can be treated with corona discharges before application or pre-coated with a primer. Mineral building materials are also usually provided with a primer before the coating composition is applied.

The coating obtained in the process of the invention can advantageously be used in a floor or wall covering or in automotive interior or on furniture.

The present invention further relates to the aqueous, radiation-curable coating composition that is used in the process of the invention and that is as described herein above. The present invention further relates to a coated substrate that is obtained by coating a substrate with the process as described herein above.

The present invention is now illustrated by reference to the following examples. Unless otherwise specified, all parts, percentages and ratios are on a weight basis.

Measurement Methods

Average particle size PS:

The intensity average particle size, z-average, has been determined by photon correlation spectroscopy using a Malvern Zetasizer Nano ZS. Samples are diluted in demineralized water to a concentration of approximately 0.1 g dispersion/liter. Measurement temperature 25° C. Angle of laser light incidence 173°. Laser wavelength 633 nm.

pH

The pH was measured using a Metrohm pH meter.

Solids

The solid content of the dispersion was measured on a HB43-S halogen moisture analyzer from Mettler Toledo at a temperature of 75° C.

Viscosity

The was determined using a Brookfield LV (spindle 2 at 60 rpm, room temperature)

Number Average Molecular Weight, Weight Average Molecular Weight, z-Average Molecular Weight and Molecular Weight Distribution The number average molecular weight, weight average molecular weight, z-average molecular weight and molecular weight distribution is determined with Size exclusion chromatography with three silica modified 7 μm PFG columns at 40° C. on a Waters Alliance 2695 LC system with a Waters 2410 DRI detector and a Waters 2996 PDA detector. Hexafluoroisopropanol (HFIP) and PTFA 0.1% is used as eluent with a flow of 0.8 mL/min. The samples are dissolved in the eluent using a concentration of 5 mg polymer per mL solvent. The solubility is judged with a laser pen after 24 hours stabilization at room temperature; if any scattering is visible the samples are filtered first using a 0.45 μm PTFE filter and a 150 μl sample solution is injected. The $M_w$ (weight average molecular weight), $M_z$ (z-average molecular weight) and MWD (molecular weight distribution) results are calculated with 11 narrow poly methylmethacrylate standards from 645-1.677.000 Da supplied by Agilent.

In general, a series of average molecular weights can be defined by the equation:

$$M = \Sigma N_i M^{n+1} / \Sigma N_i M_i^n,$$

whereby: n=0 gives $M=M_n$; n=1 gives $M=M_w$, n=2 gives $M=M_z$. The higher averages are increasingly more sensitive to high molecular weight polymers. $N_i$ is the number of molecules with molecular weight $M_i$.

Gloss

The gloss is determined according to ISO2813 in the direction of the drawdown and is expressed in gloss units (GU).

Stain Resistances

The coffee, red wine and mustard resistances were determined colorimetric using an eXact Standard Handheld Spectrophotometer from X-rite and are reported in Tables 5 and 6. For coffee, the spot exposure time was 1 hr resp. 6 hr and was rated after 24 hrs. For red wine and mustard, the spot exposure time was 6 hr and was rated after 24 hrs The a- and b-values were measured according to ISO 7724. The coffee and mustard resistances were determined by Δb value where Δb-value=$b_{(after\ resp\ 6\ and\ 1\ hr\ coffee\ exposure\ or\ 6\ hr\ mustard\ exposure\ and\ rated\ after\ 24\ hours)}-b_{(before\ exposure)}$. A higher Δb value indicates larger colour change due to staining, therefore worse stain resistance performance. The red wine resistance was determined colorimetric using Δa value where Δa-value=$a_{(after\ 6\ hr\ red\ wine\ exposure\ and\ rated\ after\ 24\ hours)}-a_{(before\ exposure)}$. A higher Δa value indicates larger colour change due to staining, therefore worse stain resistance performance. The a*axis is relative to the green-red opponent colours, with negative values toward green and positive values toward red. The b* axis represents the blue-yellow opponents, with negative numbers toward blue and positive toward yellow.

Method to Calculate the Urea Content in Polyurethane (a)

As known by a person skilled in the art, the concentration of urea bonds in polyurethane (A) in meq/g solids is determined by calculation according to the formula given below.

$$\text{Urea content } PU(A) = \Big(\big((\text{Total } NCO - \text{Total } OH - \text{Total } NH_x) * ED * (AF_{CE}/AH_{CE})\big) + ((\text{Total } NCO - \text{Total } OH - \text{Total } NH_x) * (1 - ED) * 0.5) + \text{Total } NH_x\Big) * 1000/W_{PU(A)}$$

wherein

Total NCO: the number of NCO groups in moles originating from component (A1),

Total OH: the number of alcohol groups in moles originating from component (A2) to (A5), Total $NH_x$: the total number of amine ($NH_x$ where x=1 or 2) groups in moles originating from component (A2) to (A3)

$W_{PU(A)}$: total weight of polyurethane (A) [components (A1)-(A6)] in grams,

ED: extension degree: the molar ratio of active hydrogens in the nitrogen containing chain extender (A6) to theoretical residual isocyanate groups in the polyurethane prepolymer (=Total NCO– Total OH– Total $NH_X$), $AH_{CE}$: Number of active hydrogens in the nitrogen containing chain extender (A6) where each $NH_x$ (wherein x=1 or 2) functionality counts as one active hydrogen, except for hydrazides in which the NH groups connected to the carbonyl groups are not considered chain extending groups.

$AF_{CE}$: $NH_x$ functionality of the nitrogen containing chain extender (A6) wherein x=1 or 2 and wherein for a hydrazide the NH groups connected to the carbonyl groups are not considered chain extending groups.

We illustrate this calculation with the following theoretical examples.

Calculation of Urea Group Content in Polyurethane (a) for Theoretical Examples I-VI

| Prepolymer composition theoretical examples I-V | Gram | mol NCO | Mol OH |
|---|---|---|---|
| IPDI [A1] | 40.7 | 0.366 | |
| PPG1000 [OHV 112.5 mg KOH/g] [A4] | 54.2 | | 0.108 |
| DMPA [A2] | 5 | | 0.075 |
| Total NCO [mol] | | 0.366 | |
| Total OH [mol] | | | 0.183 |

| | Theoretic Ex I | Theoretic Ex II | Theoretic Ex III | Theoretic Ex IV | Theoretic Ex. V |
|---|---|---|---|---|---|
| ED [—] | 0.9 | 0.9 | 0 [full water extension] | 0.9 | 0.9 |

-continued

| | | | | | |
|---|---|---|---|---|---|
| Hydrazine [A6] 32 g/mol [100%] $AF_{CE} = 2$, $AH_{CE} = 2$ | 2.76 (0.082 mol) | — | — | — | — |
| Diethylenetriamine [A6] 103.2 g/mol [100%] $AF_{CE} = 3$, $AH_{CE} = 3$ | — | — | — | 5.7 (0.055 mol) | — |
| Ethanolamine [A6] 61.08 g/mol [100%] $AF_{CE} = 1$, $AH_{CE} = 2$ | — | 5.03 (0.082 mol) | — | — | — |
| Adipic dihydrazide [A6] 174.2 g/mol $AF_{CE} = 2$, $AH_{CE} = 2$ | — | — | — | — | 14.3 (0.082 mol) |
| $W_{PUA}$ [g] | 102.6 | 104.9 | 99.9 | 105.6 | 114.2 |
| Urea content [meq/g] | 1.7 | 0.9 | 0.9 | 1.6 | 1.5 |

Prepolymer composition theoretical example VI

| | Gram | mol NCO | Mol OH | Mol $NH_x$ |
|---|---|---|---|---|
| IPDI [A1] | 40.7 | 0.366 | | |
| PPG1000 [OHV 112.5 mg KOH/g] [A4] | 54.2 | | 0.108 | |
| DMPA [A2] | 5 | | 0.075 | |
| Vestamin A-95 [A2] Sodium N-(2-Aminoethyl)Aminoethanesulfonate (51% w/w solution in water) Amine number 260 mg KOH/g of the aqueous solution | 35.4 | | | 0.164 |
| Total NCO [mol] | | 0.366 | | |
| Total OH [mol] | | | 0.183 | |
| Total $NH_x$ | | | | 0.164 |
| ED [—] | | 0 [water extension] | | |
| $W_{PUA}$ [g] | | 118.0 | | |
| Urea content [meq/g] | | 1.5 | | |

Method to Calculate the Dry Film Thickness

The dry film thickness is calculated by multiplying the wet film thickness times the solids content of the formulation used.

$$DFT = WFT * \text{solids content}/100$$

Where

DFT: dry film thickness in μm

WFT: wet film thickness in μm

Solids content (wt. %): total weight of all solid compounds present in formulation divided by (total weight of the formulation*100).

Components and abbreviations used:

IPDI=Isophorone diisocyanate available from Covestro

HDI=hexane diisocyanate available from Covestro

Desmodur® W=DesW=HMDI=dicyclohexylmethane diisocyanate available from Covestro

DMPA=dimethylolpropionic acid available from Perstorp polyols

PPG2000=polypropylene glycol, OH-number=56 mg KOH/g available from BASF pTHF1000=polytetramethylene glycol, OH-number=112.5 mg KOH/g available from BASF pTHF650=polytetramethylene glycol, OH-number=173 mg KOH/g available from BASF Ymer™ N120=nonionic diol, OH-number=110 mg KOH/g available from Perstorp CHDM=1,4-cyclohexanedimethanol available from Eastman NPG=neopentylglycol available from Perstorp TEA=triethylamine from Arkema DPGDA=dipropyleneglycoldiacrylate, available from Covestro GPTA=propoxylated(3)glycerol triacrylate available from Covestro TMPTA=tromethylolpropanetriacrylate available from Covestro DiTMPTA=ditrimethylolpropane tertraacrylate available from Covestro Agisyn™ 2020=Partly acrylated epoxidized soya oil, available from Covestro Agisyn™ 2830L=Dipentaerythritolhexaacrylate, available from Covestro EGDMA=ethyleneglycoldimethacrylate available from Covestro BHT=butylated hydroxyl toluene available from Brenntag Hydrazine=Hydrazine hydrate (16%) available from Arkema Vestamin A-95=Sodium N-(2-Aminoethyl)Aminoethanesulfonate (51% w/w solution in water)

EDA=ethylenediamine available from Caldic

BismuthND=bismuthneodecanoate catalyst available from Reaxis

Omnirad 500=photoinitiator available from IGM

Omnirad 1173=photoinitiator from IGM

BYK 346=Surfactant available from BYK (45% solids)

Butylglycol=solvent available from Aldrich

TEGO® Airex 902W=defoamer available from Evonik (24% solids)

Borchi® Gel L 75 N=Rheology modifier available from Borchers (50% solids)

Acematt® TS 100=silica matting agent from Evonik

Example 1: Preparation of a Polyurethane Resin Dispersion (PUD Ex 1)

A 1000 $cm^3$ flask equipped with a thermometer and overhead stirrer was charged with components DMPA (15.0 g), PPG2000 (169.2 g) and IPDI (65.1 g). The reaction was heated to 50° C. Then 0.08 g of BismuthNeodecanoate was added. After the exotherm was complete the reaction was kept at 90° C. for 120 minutes. The NCO content of the resultant isocyanate-terminated prepolymer was 2.93% (theoretically 3.29%). The prepolymer was cooled down to 80° C. and DPGDA (167.8 g), BHT (0.17 g) and TEA was added (II.3 g) and mixed for 10 minutes at 50-60° C.

A dispersion of the resultant isocyanate-terminated prepolymer was made by feeding 285.8 g of the resulting prepolymer mixture in 45 minutes to deionized water (505.7 g).

The dispersion temperature was controlled between 25 to 30° C. Hydrazine (10.4 g) was added after the feed was completed.

Examples 2-7: Preparation of Polyurethane Resin Dispersions (PUD Ex. 2—PUD Ex. 7)

For Examples 2, 3, 4, 5 and 7, the process as described for Example 1 was repeated with the components and the amounts as specified in Table 1a, except that the radiation-curable diluent (TMPTA in Example 2, GPTA in Example 3 and DPGDA in Examples 4, 5 and 7) was charged to the reactor at the start of the prepolymer reaction, together with the other components (polyisocyanate(s), dispersing diol, nonionic diol (if used) and polyol). For Example 6, the process as described for example 1 was repeated with the components and the amounts as specified in Table 1a, except that DPGDA was charged to the reactor at the start of the prepolymer reaction, together with the other components (polyisocyanate, DMPA, and polyol) and DiTMPTA (instead of DPGDA) was added to the prepolymer after it has been cooling down.

Comparative Experiment 1: Preparation of a Polyurethane Resin Dispersion (PUD CEx 1)

A 1000 $cm^3$ flask equipped with a thermometer and overhead stirrer was charged with components DMPA (24.9 g), PPG2000 (282.1 g) and IPDI (108.6 g). The reaction was heated to 50° C. Then 0.08 g of BismuthNeodecanoate was added. After the exotherm was complete the reaction was kept at 90° C. for 120 minutes. The NCO content of the resultant isocyanate-terminated prepolymer was 2.74% (theoretically 3.29%). The prepolymer was cooled down to 80° C. and TEA was added (18.8 g).

A dispersion of the resultant isocyanate-terminated prepolymer was made by feeding 289 g of the resulting prepolymer mixture in 45 minutes to deionized water (492.5 g).

The dispersion temperature was controlled between 25 to 30° C. Hydrazine (16.3 g) was added after the feed was completed.

Comparative Experiments 2-6: Preparation of Polyurethane Resin Dispersion (PUD CEx. 2—PUD CEx. 6))

For Comparative Experiments 2-6, the process as described for Comparative Experiment 1 was repeated with the components and the amounts as specified in Table 1b, except that radiation-curable diluent was also applied that has been added after cooling down of the prepolymer and prior to dispersing. For Comparative Experiments 5-6, the process as described for Comparative Experiment 1 was repeated with the components and the amounts as specified in Table 1b, except that the radiation curable diluent (DPGDA) was charged to the reactor at the start of the prepolymer reaction, together with the other components (i.e. polyisocyanate, dispersing diol and polyol(s)).

Table 1a and 1b specifies the components and its amounts applied for preparing the polyurethane resin dispersions of Examples 1-7 and Comparative Experiments 1-6.

Unless specified otherwise, the amounts of the different components are expressed in grams.

The properties of the resulting compositions are represented in Table 2.

TABLE 1a-1

Composition of PUD Examples 1-7 - preparation of prepolymer mixture

| | Component | Ex. 1 | Ex. 2 | Ex. 3 | Ex. 4 | Ex. 5 | Ex. 6 | Ex. 7 |
|---|---|---|---|---|---|---|---|---|
| IPDI | Polyisocyanate (A1) | 65.1 | 78.5 | 91.4 | 94.0 | 64.2 | 70.5 | |
| HDI | Polyisocyanate (A1) | | | | | 16.0 | | |
| DesW | Polyisocyanate (A1) | | | | | | | 97.3 |
| DMPA | Dispersing diol (A2) | 15.0 | 18 | 25.5 | 21.6 | 17.5 | 16.2 | 17.5 |
| PPG2000 | Polyol (A4) | 169.2 | | 152.8 | 244.1 | | 183.1 | |
| pTHF2000 | Polyol (A4) | | 203.2 | | | 251.9 | | 234.8 |
| Ymer ™ N120 | Nonionic diol (A3) | | | 30 | | | | |
| DPGDA, F = 2, $M_n$ = 242 g/mol | Radiation-curable diluent (B) | 167.8 | | | 240 | 150 | 90 | 150 |
| GPTA, F = 3, $M_n$ = 428 g/mol | Radiation-curable diluent (B) | | | 200 | | | | |
| TMPTA, F = 3, $M_n$ = 296 g/mol | Radiation-curable diluent (B) | | 200 | | | | | |

TABLE 1a-1-continued

| Composition of PUD Examples 1-7 - preparation of prepolymer mixture | | | | | | | | |
|---|---|---|---|---|---|---|---|---|
| | Component | Ex. 1 | Ex. 2 | Ex. 3 | Ex. 4 | Ex. 5 | Ex. 6 | Ex. 7 |
| DiTMPTA, F = 4, $M_n$ = 467 g/mol | Radiation-curable diluent (B) | | | | | | 90 | |
| BHT | Inhibitor | 0.17 | 0.20 | 0.120 | 0.24 | 0.15 | 0.18 | 0.15 |
| BismuthND | Catalyst | 0.08 | 0.10 | 0.10 | 0.12 | 0.10 | 0.09 | 0.10 |
| TEA | Neutralizing base | 11.3 | 13.6 | 19.2 | 16.3 | 13.2 | 12.2 | 13.2 |

TABLE 1a-2

| Composition of PUD Examples 1-7 - dispersing step | | | | | | | | |
|---|---|---|---|---|---|---|---|---|
| | | Ex. 1 | Ex. 2 | Ex. 3 | Ex. 4 | Ex. 5 | Ex. 6 | Ex. 7 |
| PU prepolymer from Table 1a-1 | | 286 | 360 | 360 | 503 | 360 | 283 | 363 |
| Water | | 506 | 632 | 460 | 890 | 740 | 508 | 680 |
| Hydrazine (16%) | Chain extender (A6) | 10.4 | 12.6 | 10.5 | 14.2 | 10.7 | | 11.8 |
| EDA | Chain extender (A6) | | | | | | 2.62 | |

TABLE 1b-1

| Composition of PUD of Comparative Experiments 1-6 - preparation of prepolymer mixture | | | | | | | |
|---|---|---|---|---|---|---|---|
| | Component | CE1 | CE2 | CE3 | CE4 | CE5 | CE6 |
| IPDI | Polyisocyanate (A1) | 108.6 | 65.1 | 65.1 | 47.0 | 124.2 | 140.3 |
| DMPA | Dispersing diol (A2) | 24.9 | 15.0 | 15.0 | 10.8 | 14.4 | 14.4 |
| pTHF650 | Polyol (A4) | | | | | | 75.21 |
| pTHF1000 | Polyol (A4) | | | | | 88.91 | |
| PPG2000 | Polyol (A4) | 282.1 | 169.2 | 169.2 | 122.1 | | |
| CHDM | Polyol (A5) | | | | | 12 | |
| NPG | Polyol (A5) | | | | | | 9.6 |
| DPGDA, F = 2, $M_n$ = 242 g/mol | Radiation-curable diluent (B) | | | | | 160 | 160 |
| Agisyn™ 2020, Average F = 2, $M_n$ = 1100 g/mol | Radiation-curable diluent | | 167.8 | | | | |
| Agisyn™ 2830L F = 6, $M_n$ = 579 g/mol | Radiation-curable diluent | — | — | 167.8 | | | |
| EGDMA, F = 2 (methacylate) $M_n$ = 198 g/mol | Radiation-curable diluent | | | | 120 | | |
| BHT | Inhibitor | — | 0.17 | 0.17 | 0.120 | 0.160 | 0.16 |
| BismuthND | Catalyst | 0.08 | 0.07 | 0.07 | 0.06 | 0.08 | 0.08 |
| TEA | Neutralizing base | 18.8 | 11.3 | 11.3 | 8.1 | 10.9 | 10.9 |

TABLE 1b-2

| Composition of PUD of Comparative Experiments 1-6 - dispersing step | | CE1 | CE2 | CE3 | CE4 | CE5 | CE6 |
|---|---|---|---|---|---|---|---|
| PU prepolymer from Table 1b-1 | | 289 | 286 | 286 | 205 | 257 | 257 |
| Water | | 493 | 505 | 505 | 360 | 385 | 385 |
| Hydrazine (16%) | Chain extender (A6) | 16.3 | 10.2 | 10.3 | 8.7 | 26.2 | 30.9 |

TABLE 2

| Specifications | Ex. 1 | Ex. 2 | Ex. 3 | Ex. 4 | Ex. 5 | Ex. 6 | Ex. 7 |
|---|---|---|---|---|---|---|---|
| Solids [wt %] | 33.8 | 34.8 | 42.1 | 34.6 | 31.0 | 35.6 | 33.01 |
| Viscosity [mPas] | 810 | 147 | 530 | 56 | 92 | 35 | 11 |
| pH | 8.2 | 8.2 | 7.9 | 8.3 | 8.0 | 7.7 | 8.4 |
| PS [nm]/ | 121 | 68 | 67 | 52 | 68 | 70 | 192 |
| NCO % Prepol [%] | 2.74 | 1.68 | 1.40 | 1.35 | 1.43 | 1.94 | 1.57 |
| NCO/OH [—] | 1.5 | 1.5 | 1.39 | 1.5 | 1.5 | 1.5 | 1.5 |
| Acid value polyurethane (A)[mg KOH/g solids] | 24.9 | 24.8 | 35.2 | 24.8 | 20.7 | 24.8 | 20.7 |
| $M_w$ [KDalton] | 468.8 | 97.9 | 58.9 | 33.2 | 63.0 | 58.5 | 37.9 |
| $M_z$ [KDalton] | 2666.7 | 707.5 | 254.1 | 69.0 | 253.3 | 161.8 | 135.8 |
| Weight ratio (A) to (B) | 60:40 | 60:40 | 60:40 | 60:40 | 70:30 | 60:40 | 70:30 |
| Urea content [meq/g PU (A)] | 0.73 | 0.74 | 0.71 | 0.73 | 0.69 | 0.73 | 0.66 |

| | CE1 | CE2 | CE3 | CE4 | CE5 | CE6 |
|---|---|---|---|---|---|---|
| Solids [wt %] | 30.0 | 34.7 | 34.8 | 35.0 | 36.3 | 36.8 |
| Viscosity [mPas] | 38 | 35 | 58 | 36 | 200 | 93 |
| pH | 8.0 | 9.2 | 8.4 | 8.1 | 7.8 | 7.7 |
| PS [nm]/ | 32 | 63 | 60 | 145 | 63 | 69 |
| NCO % Prepol [%] | 2.93 | 2.86 | 2.90 | 3.40 | 4.89 | 5.77 |
| NCO/OH [—] | 1.5 | 1.5 | 1.5 | 1.5 | 2.0 | 2.0 |
| Acid value PU [mg KOH/g solids] | 24.9 | 24.9 | 24.9 | 24.9 | 24.3 | 24.2 |
| $M_w$ [KDalton] | 288.3 | 889.1 | 348.6 | 414.2 | | |
| $M_z$ [KDalton] | 1496.6 | 2727.9 | 1743.6 | 4774.6 | | |
| Urea content [meq/g PU] | 0.73 | 0.73 | 0.73 | 0.73 | 2.80 | 3.04 |
| Weight ratio PU:radiation curable diluent | 100:0 | 60:40 | 60:40 | 60:40 | 61:39 | 61:39 |

Preparation of Formulations

The PUDs of Examples 1-7 and Comparative Experiments 1-6 were formulated as shown in Table 3. The ingredients listed in Table 3 were added into a PE jar and mixed thoroughly using a Dispermill® (OrangeLine, ATP Engineering B.V.).

TABLE 3

Formulations without and with matting agent from PUDs Examples 1-7 and from PUDs Comparative Experiments 1-6

| Formulation (solids content in wt. %) | Binder (grams) [Binder solids content (%] | Demi water (grams) | Butyl-glycol (grams) | BYK 346 (grams) | Tego Airex 902W (grams) | Borch Gel L75N/demi water 1:1 (grams) | Omnirad 500 (grams) | Acematt ® TS100 (grams) |
|---|---|---|---|---|---|---|---|---|
| Formulation 1a (28.0 wt. %) | PUD Ex 1 (76) [33.8%] | 17.1 | 1 | 0.5 | 0.5 | 1 | 1 | |
| Formulation 1b (29.3 wt. %) | PUD Ex 1 (76) [33.8%] | 17.1 | 1 | 0.5 | 0.5 | 1 | 1 | 1.7 |
| Formulation 2a (28.0 wt. %) | PUD Ex 2 (76) [34.8%] | 19.8 | 1 | 0.5 | 0.5 | 1 | 1 | |

TABLE 3-continued

Formulations without and with matting agent from PUDs Examples 1-7 and from PUDs Comparative Experiments 1-6

| Formulation (solids content in wt. %) | Binder (grams) [Binder solids content (%] | Demi water (grams) | Butyl-glycol (grams) | BYK 346 (grams) | Tego Airex 902W (grams) | Borch Gel L75N/demi water 1:1 (grams) | Omnirad 500 (grams) | Acematt ® TS100 (grams) |
|---|---|---|---|---|---|---|---|---|
| Formulation 2b (29.3 wt. %) | PUD Ex 2 (76) [34.8%] | 19.8 | 1 | 0.5 | 0.5 | 1 | 1 | 1.8 |
| Formulation 3a (28.0 wt. %) | PUD Ex 3 (76) [42.1%] | 39.6 | 1 | 0.5 | 0.5 | 1 | 1 | |
| Formulation 3b (29.3 wt. %) | PUD Ex 3 (76) [42.1%] | 39.6 | 1 | 0.5 | 0.5 | 1 | 1 | 2.1 |
| Formulation 4a (28.0 wt. %) | PUD Ex 4 (76) [34.6%] | 19.3 | 1 | 0.5 | 0.5 | 1 | 1 | |
| Formulation 4b (29.3 wt. %) | PUD Ex 4 (76) [34.6%] | 19.3 | 1 | 0.5 | 0.5 | 1 | 1 | 1.8 |
| Formulation 4c (28 wt %) | PUD EX 4 (75) [34.6%] | 20.5 | 1 | 0.5 | 0.5 | 1 | 0.6 [Omni-rad 1173 instead of Omnira 500] | |
| Formulation 5a (28.0 wt. %) | PUD Ex 5 (76) [31.0%] | 9.5 | 1 | 0.5 | 0.5 | 1 | 1 | |
| Formulation 5b (29.3 wt. %) | PUD Ex 5 (76) [31.0%] | 9.5 | 1 | 0.5 | 0.5 | 1 | 1 | 1.6 |
| Formulation 6a (28.0 wt. %) | PUD Ex 6 (76) [35.6%] | 22.0 | 1 | 0.5 | 0.5 | 1 | 1 | |
| Formulation 6b (29.3 wt. %) | PUD Ex 6 (76) [35.6%] | 22.0 | 1 | 0.5 | 0.5 | 1 | 1 | 1.8 |
| Formulation 7a (28.0 wt. %) | PUD Ex 7 (76) [33.0%] | 14.9 | 1 | 0.5 | 0.5 | 1 | 1 | |
| Formulation 7b (29.3 wt. %) | PUD Ex 7 (76) [33.0%] | 14.9 | 1 | 0.5 | 0.5 | 1 | 1 | 1.7 |
| Formulation 8 (28.0 wt. %) | PUD Comp Ex 1 (76) [30.0%] | 6.8 | 1 | 0.5 | 0.5 | 1 | 1 | |
| Formulation 9 (28.0 wt. %) | PUD Comp Ex 2 (76) [34.7%] | 19.5 | 1 | 0.5 | 0.5 | 1 | 1 | |
| Formulation 10 (28.0 wt. %) | PUD Comp Ex 3 (76) [34.8%] | 19.8 | 1 | 0.5 | 0.5 | 1 | 1 | |
| Formulation 11 (28.0 wt. %) | PUD Comp Ex 4 (76) [35.0%] | 20.4 | 1 | 0.5 | 0.5 | 1 | 1 | |
| Formulation 12 (28.0 wt. %) | PUD Comp Ex 5 (76) [36.3%] | 23.9 | 1 | 0.5 | 0.5 | 1 | 1 | |
| Formulation 13 (28.0 wt. %) | PUD Comp Ex 6 (76) [36.8%] | 25.2 | 1 | 0.5 | 0.5 | 1 | 1 | |

Application of Formulations

The so-obtained coating compositions were applied on a Leneta card (2C Leneta Inc) using a 125 μm wire rod applicator. The coated cards were dried for 10 minutes in an oven with airspeed of 1.2 m/s at 50° C. Subsequently the so-obtained dried composition was cured, the cure conditions are indicated in Tables 4-6. In Table 7 resp. a 125, 75, 50 and 25 μm wire rod applicator were used.

Curing of the Dried Coating Composition

Excimer/UV Cure:

Immediately (within 20 seconds) after drying the formulations were cured on a UVio curing rig with a conveyor belt speed of 15 m/min equipped with 2 lamps. The first Lamp was an Excirad 172 lamp (IoT GmbH, xenon based excimer lamp generating 172 nm light) under which the cure was performed with a radiation dose of, except for formulation 4c, 11.4 mJ/$cm^2$ (determined with a Tinytracker 172, IoT GmbH) in a nitrogen atmosphere (O2 level <50 ppm detected with IoT inline detector). The next cure step was performed by the second lamp being a Light Hammer 10 Mark III equipped with a H-bulb operating @50% power (Heraeus Holding, Hg doped UV lamp generating UV light with wave lengths≥315 nm, 181 mJ/$cm^2$ total dose as determined with an Power Puck II (EIT Inc)).

Conventional UV Cure Atmospheric (Conv UV Cure Atmosph):

Immediately (within 20 seconds) after drying the formulations were cured on a UVio curing rig with a conveyor belt speed of 15 m/min. The cure step was performed by a Light Hammer 10 Mark III equipped with a H-bulb operating @50% power (Heraeus Holding, Hg doped UV lamp generating UV light with wave lengths ≥315 nm, 181 mJ/$cm^2$ total dose as determined with an Power Puck II (EIT Inc)) in air.

Conventional UV Cure Inert (Conv UV Cure Inert):

Immediately (within 20 seconds) after drying the formulations were cured on a UVio curing rig with a conveyor belt speed of 15 m/min. The cure step was performed by a Light Hammer 10 Mark III equipped with a H-bulb operating @50% power (Heraeus Holding, Hg doped UV lamp generating UV light with wave lengths ≥315 nm, 181 mJ/$cm^2$ total dose as determined with an Power Puck II (EIT Inc)) under inert atmosphere.

Testing of the Cured Coatings

The gloss and the coffee, red wine and mustard resistances of the cured coatings were determined as described above. The measured gloss values are reported in Table 4 and 6. The coffee, red wine and mustard resistances are reported in Tables 4 and 5.

TABLE 4

Gloss values measured of the formulation not containing matting agent and cured with Excimer/UV cure; gloss values of the formulation containing matting agent and cured with the conventional UV cure process under atmospheric conditions; stain resistances measured colorimetric of the formulation not containing matting agent and cured with Excimer/UV cure and stain resistances measured colorimetric of the formulation containing matting agent and cured with the conventional UV cure process under atmospheric conditions (Conv UV atmosph) resp. cured with the conventional UV cure process under inert conditions (Conv UV inert)

| | Examples Formulation without matting agent (formulations 1a-7a) Excimer/UV cure | | | Comparative Experiments Formulation with matting agent(formulations 1b-7b) Conv UV Atmosp | | | Comparative Experiments Formulation with matting agent(formulations 1b-7b) Conv UV Inert | |
|---|---|---|---|---|---|---|---|---|
| | Gloss (GU20°/ GU60°) | Δb Coffee 6 hrs | Δa Red Wine 6 hrs | Gloss (GU20°/ GU60°) | Δb Coffee 6 hrs | Δa Red Wine 6 hrs | Δb Coffee 6 hrs | Δa Red Wine 6 hrs |
| PUD Ex. 1 | 0.1/1.1 | 3.5 | 0 | 0.2/2.9 | 13.7 | 13.8 | 15.1 | 7.5 |
| PUD Ex. 2 | 0.6/5.6 | 3.4 | −0.3 | 0.4/4.7 | 13.1 | 5.9 | 11.3 | 1.4 |
| PUD Ex. 3 | 0.3/3 | 8.7 | 0.6 | 0.3/3.5 | 16.3 | 12.2 | 13.3 | 5.9 |
| PUD Ex. 4 | 0/0.6 | 3.5 | 0.1 | 0.8/8.6 | 16.1 | 12.6 | 14.4 | 5.3 |
| PUD Ex. 5 | 0.1/0.8 | 9.2 | 0.1 | 0.5/5.6 | 20.0 | 7.5 | 17.8 | 8 |
| PUD Ex. 6 | 0.3/2 | 8.7 | 0.2 | 0.6/6.8 | 16.1 | 12.3 | 15.2 | 8.7 |
| PUD Ex. 7 | 0.3/4 | 9.8 | 0 | 0.6/6.1 | 17.9 | 6.2 | 15.5 | 5.5 |

FIG. 1 shows the coated testcard obtained by the Excimer/UV curing process according to the process of the invention of the formulation 4a containing the PUD of Example 4 without matting agent (upper testcard) and the coated testcard obtained by conventional UV curing under atmospheric conditions of the formulation 4b containing the PUD of Example 4 with matting agent (bottom testcard);

from left to right: Coffee [6 hrs], Red Wine [6 hrs] and Coffee [1 hr] stains.

TABLE 5

Stain resistances measured colorimetric (Δb for coffee and mustard and Δa for red wine) of the formulation without matting agent and cured with Excimer/UV cure.

| Formulation without matting agent | | Δb Coffee 1 hr Excimer/ UV cure | Δb Coffee 6 hrs Excimer/ UV cure | Δa Red Wine 6 hr Excimer/ UV cure | Δb Mustard 6 hrs Excimer/ UV cure |
|---|---|---|---|---|---|
| Formulation 1a | PUD Ex. 1 | 1.2 | 3.5 | 0 | 2 |
| Formulation 2a | PUD Ex. 2 | 1 | 3.4 | −0.3 | 1.2 |
| Formulation 3a | PUD Ex. 3 | 4.6 | 8.7 | 0.6 | 7.6 |
| Formulation 4a | PUD Ex. 4 | 0.8 | 3.5 | 0.1 | 4.1 |
| Formulation 5a | PUD Ex. 5 | 3.9 | 9.2 | 0.1 | 6.4 |
| Formulation 6a | PUD Ex. 6 | 3.1 | 8.7 | 0.2 | 5.9 |
| Formulation 7a | PUD Ex. 7 | 3 | 9.8 | 0 | 4.1 |

TABLE 6

Gloss values measured after combined excimer/UV cure and conventional UV cure under atmospheric conditions of the formulation without matting agent.

| | | Excimer/UV cure | | Conventional UV Cure atmospheric | |
|---|---|---|---|---|---|
| | | GU 20° | GU 60° | GU 20° | GU 60° |
| Formulation 1a | PUD Ex. 1 | 0.1 | 1.1 | 60 | 86 |
| Formulation 2a | PUD Ex. 2 | 0.6 | 5.6 | 69 | 90 |
| Formulation 3a | PUD Ex. 3 | 0.3 | 3 | 70 | 85 |
| Formulation 4a | PUD Ex. 4 | 0 | 0.6 | 64 | 85 |
| Formulation 5a | PUD Ex. 5 | 0.1 | 0.8 | 66 | 85 |
| Formulation 6a | PUD Ex. 6 | 0.3 | 2 | 52 | 84 |
| Formulation 7a | PUD Ex. 7 | 0.3 | 4 | 59 | 88 |
| Formulation 8 | PUD CEx. 1 | 61 | 86 | 60 | 86 |
| Formulation 9 | PUD CEx. 2 | 67 | 90 | 61 | 86 |
| Formulation 10 | PUD CEx. 3 | 65 | 88 | 64 | 87 |
| Formulation 11 | PUD CEx. 4 | 47 | 82 | 52 | 81 |
| Formulation 12 | PUD CEX. 5 | 69 | 90 | 72 | 89 |
| Formulation 13 | PUD CEX. 6 | 66 | 88 | 68 | 88 |

Coating formulation 4c was applied on a Leneta card (2C Leneta Inc) using a 125 μm wire rod applicator. The coated card was dried for 10 minutes in an oven with airspeed of 1.2 m/s at 50° C. Subsequently the so-obtained dried composition was cured according to the cure conditions described above except for the radiation dose of the Excirad 172 lamp which was 4.0 mJ/cm$^2$ instead of 11.4 mJ/cm$^2$. After 1 hour, a second layer of coating formulation 4c was applied on the first coating layer using a 125 μm wire rod applicator without further treatment of the 1$^{st}$ layer (e.g. sanding), and the same drying and curing conditions were applied.

After the second layer was cured, the intercoat adhesion was tested by using a finger nail.

The fingernail was placed on the coating with a certain force as described below and moved over the coating over a distance of approximately 5 cm. When the 2$^{nd}$ coating layer easily peels from the 1$^{st}$ coating layer with a small/gentle force, the score is "–"; when the 2$^{nd}$ coating layer peels from the 1$^{st}$ coating layer when using a moderate force, the score is "+/–"; when the 2$^{nd}$ coating layer does not peel from the 1$^{st}$ coating layer even when applying a high force, the score is "+".

When the coating layers do not peeled with the fingernail test after applying a high force, the test is repeated with a stainless steel spatula with a non-curved blade width of 8 mm instead of the fingernail. The spatula is held at a 45 degree angle and is moved over the coating over a distance of approximately 5 cm with a certain force as described above for the fingernail test. The same score is used as for the finger nail test.

Table 7 reports the scores for the fingernail and spatula test and the measured gloss values for the cured coatings obtained from formulation 4c.

TABLE 7

| Intercoat adhesion | Fingernail | Spatula | Gloss Units [20°/60°/85°] 1$^{st}$ layer | Gloss Units [20°/60°/85°] 2$^{nd}$ layer |
|---|---|---|---|---|
| Formulation 4c | + | + | 0.1/0.8/6.2 | 0.1/10/15 |

TABLE 8

Effect of layer thickness on gloss values

| Formulation | Layer thickness wet film thickness [μm] | Dry Film thickness [μm] | Gloss Unites [20°/60°/85°] |
|---|---|---|---|
| 4a | 125 | 35 | 0/0.6/3.7 |
| 4a | 75 | 21 | 0.1/0.6/2.8 |
| 4a | 50 | 14 | 0.1/0.6/3.2 |
| 4a | 25 | 7 | 0.1/0.7/7.4 |
| 4a | 125 - conventional UV cure | 35 | 77/86/98 |
| 4b | 25 - matting agent, conventional UV cure | 7 | No decent film obtained |

With the process of the invention, low gloss coatings can be obtained with a very low dry film thickness, even low gloss coatings with a dry film thickness of 7 micron could be obtained, while when the formulation contains matting agent (formulation 9b) and the formulation was cured with conventional UV curing, a decent film with such a low dry film thickness could not be obtained.

Comparative Experiments 7-13

A representative group of commercially available waterborne UV curable coating dispersions, as specified in Table 9, were applied on a Leneta card (2C Leneta Inc) using a 125 μm wire rod applicator. The coated cards were dried for 10 minutes in an oven with airspeed of 1.2 m/s at 50° C. Subsequently the so-obtained dried composition was cured using Conventional UV cure atmospheric and Excimer/UV cure as described above. The measured gloss values are reported in Table 9. The commercially available waterborne UV curable coating compositions as indicated in Table 9 have a different composition than the aqueous, radiation-curable coating composition of the present invention.

TABLE 9

Gloss values measured after conventional UV cure under atmospheric conditions and combined Excimer/UV cure of a representative group of commercially available waterborne UV curable coating compositions

| | Conventional UV Cure atmospheric | | | Excimer/UV cure | | |
|---|---|---|---|---|---|---|
| | GU 20° | GU 60° | GU 85° | GU 20° | GU 60° | GU 85° |
| NeoRad ™ UV14 | 70 | 89 | 97 | 72 | 90 | 97 |
| NeoRad ™ R-520 | 78 | 93 | 99 | 80 | 93 | 99 |
| NeoRad ™ R-540 | 66 | 90 | 96 | 70 | 90 | 96 |
| Decovery ® SP-7100 | 71 | 92 | 98 | 65 | 91 | 97 |
| Bayhydrol ® UV 2280 | 82 | 95 | 99 | 81 | 94 | 99 |

TABLE 9-continued

Gloss values measured after conventional UV cure under atmospheric conditions and combined Excimer/UV cure of a representative group of commercially available waterborne UV curable coating compositions

| | Conventional UV Cure atmospheric | | | Excimer/UV cure | | |
|---|---|---|---|---|---|---|
| | GU 20° | GU 60° | GU 85° | GU 20° | GU 60° | GU 85° |
| Bayhydrol ® UV 2282 | 29 | 64 | 69 | 30 | 66 | 72 |
| Bayhydrol ® eco UV 2877 | 69 | 91 | 98 | 72 | 92 | 97 |

Table 9 illustrates that the representative group of commercially available, waterborne UV curable dispersions, when subjected to Excimer/UV cure, do not result in matt coatings.

The invention claimed is:

1. A process for producing a coating from an aqueous, radiation-curable coating composition, wherein the process comprises the steps in the sequence (1) to (4):

(1) applying an aqueous, radiation-curable coating composition on a surface of a substrate, (2) drying the aqueous, radiation-curable coating composition, affording an at least partially dried coating composition, (3) irradiating the at least partially dried coating composition with UV light having a wavelength ≤220 nm under inert atmosphere, followed by (4) irradiating with UV light having a wavelength ≥300 nm or with E-beam, wherein the aqueous, radiation-curable coating composition is a dispersion comprising:

(A) at least one water-dispersible polyurethane (A), wherein the polyurethane (A) has a urea group (—NH—CO—NH—) concentration of at least 0.1 milli-equivalents per g of polyurethane (A) and of at most 2.6 milli-equivalents per g of polyurethane (A) and the polyurethane (A) has an unsaturated bond concentration of less than 0.25 meq per g of polyurethane (A), (B) at least one radiation-curable diluent (B) with a molar mass less than 750 g/mol and with an acrylate functionality of from 2 to 5, and (C) water and optionally organic solvent, whereby the optional organic solvent is present in an amount of at most 30 wt. %, based on the total amount of water and organic solvent, wherein the amount of (A) is from 30 to 85 wt. % and the amount of (B) is from 15 to 70 wt. %, based on the total amount of (A) and (B).

2. The process of claim 1, wherein the polyurethane (A) has a urea group content of at most 1.3 meq per g of (A) and of at least 0.4 meq per g of (A).

3. The process of claim 1, wherein (A) and (B) together have a z-average molecular weight $M_z$ of at least 25,000 g/mol, whereby the z-average molecular weight $M_z$ is determined as described in the description.

4. The process of claim 1, wherein at least one of the radiation-curable diluents (B) has an acrylate functionality of from 2 to 3.

5. The process of claim 1, wherein the aqueous, radiation-curable coating composition comprises at least two radiation-curable diluents (B) and the radiation-curable diluents (B) present in the aqueous, radiation-curable coating composition have an average acrylate functionality according to formula $$\bar{f} = \frac{\sum_k \frac{w_k}{M_k} f_k}{\sum_k \frac{w_k}{M_k}}$$

of from 2 to 3, in which $w_k$ is the amount of acrylate diluents (B) in g present in the aqueous, radiation curable coating composition with a molar mass $M_k$ and with an acrylate functionality $f_k$.

6. The process of claim 1, wherein 100 wt. % of the radiation-curable diluents (B) is selected from the group consisting of:

di(trimethylolpropane) tetra-acrylate (di-TMPTA) with the corresponding molecular formula $C_{24}H_{34}O_9$ and its corresponding molar mass of 467 g/mol, di(trimethylolpropane) tri-acrylate (di-TMP3A) with the corresponding molecular formula $C_{21}H_{32}O_8$ and its corresponding molar mass of 412 g/mol, di(trimethylolpropane) tri-acrylate comprising alkoxy groups, glyceryl propoxy triacrylate (GPTA) with the corresponding molecular formula $C_{21}H_{32}O_9$ and its corresponding molar mass of 428 g/mol, glyceryl propoxy triacrylate comprising additional alkoxy groups, pentaerythritol tetra-acrylate (PET4A) with the corresponding molecular formula $C_{17}H_{20}O_8$ and its corresponding molar mass of 352 g/mol, pentaerythritol tetra-acrylate comprising alkoxy groups, pentaerythritol tri-acrylate (PET3A) with the corresponding molecular formula $C_{14}H_{18}O_7$ and its corresponding molar mass of 298 g/mol, pentaerythritol tri-acrylate comprising alkoxy groups, trimethylolpropane triacrylate (TMPTA) with the corresponding molecular formula $C_{15}H_{20}O_6$ and its corresponding molar mass of 296 g/mol, trimethylolpropane triacrylate comprising alkoxy groups, dipropyleneglycol diacrylate (DPGDA) with the corresponding molecular formula $C_{12}H_{18}O_5$ and its corresponding molar mass of 242 g/mol, dipropyleneglycol diacrylate comprising additional alkoxy groups, and any mixture thereof.

7. The process according of claim 1, wherein 100 wt. % of the radiation-curable diluents (B) is a mixture of (1) one or more of di(trimethylolpropane) tetra-acrylate (di-TMPTA), pentaerythritol tetra-acrylate (PET4A) with the corresponding molecular formula $C_{17}H_{20}O_8$ and its corresponding molar mass of 352 g/mol and pentaerythritol tetra-acrylate comprising alkoxy groups, and (2) one or more of glyceryl propoxy triacrylate (GPTA), glyceryl propoxy triacrylate comprising additional alkoxy groups, dipropyleneglycol diacrylate (DPGDA) and dipropyleneglycol diacrylate comprising additional alkoxy groups.

8. The process of claim 1, wherein the amount of (A) is from 40 to 80 wt. % and the amount of (B) is from 20 to 60 wt. %, based on the total amount of (A) and (B).

9. The process of claim 1, wherein the summed amount of (A) and (B) is from 25 to 35 wt. %, based on the entire weight of the aqueous, radiation-curable coating composition.

10. The process of claim 1, wherein the organic solvent is present in an amount of at most 1 wt. %, wherein the amount of organic solvent is given based on the total amount of water and organic solvent present in the aqueous, radiation-curable coating composition.

11. The process of claim 1, wherein the polyurethane (A) is the reaction product of at least the following components:

(A1) at least one polyisocyanate, (A2) at least one isocyanate-reactive compound that contains at least one salt group which is capable to render the polyurethane (A) dispersible in water or at least one functional group that can be converted into a salt group which is capable to render the polyurethane (A) dispersible in water, (A3) optionally at least one isocyanate-reactive compound containing at least one non-ionic group which is capable to render the polyurethane (A) dispersible in water, (A4) at least one isocyanate-reactive polyol other than (A2) and (A3) having an OH number of from 25 to 225 mg KOH/g solids, (A5) optionally at least one isocyanate-reactive polyol other than (A2) and (A3) having an OH number higher than 225 mg KOH/g solids and lower than 1850 mg KOH/g solids, and (A6) water or at least one nitrogen containing chain extender compound.

12. The process of claim 11, wherein the isocyanate-reactive polyol(s) (A4) has an OH number of from 45 to 125 mg KOH/g solids.

13. The process of claim 11, wherein the polyurethane (A) comprises the isocyanate-reactive polyols (A4) in an amount of from 35 to 65 wt. %, based on the total amounts of compounds (A1) to (A6).

14. The process of claim 1, wherein the polyurethane (A) has an acid value of from 15 to 30 mg KOH/g solids of the polyurethane (A).

15. The process of claim 1, wherein the polyurethane (A) has a radiation-curable, ethylenically unsaturated bond concentration of less than 0.01 meq per g of polyurethane (A).

16. The process of claim 1, wherein the aqueous, radiation-curable coating composition is a dispersion consisting of (A), (B) and (C) having a z-average particle size is from 20 to 1000 nm, whereby the z-average particle size is determined with the method as described in the description.

17. The process of claim 1, wherein the coating has a dry thickness of at least 2 micron, and of at most 100 micron.

18. The process of claim 1, wherein the irradiating in step (3) is effected by excimer UV lamps with UV light having a wavelength ≥120 nm.

19. The process of claim 1, wherein UV irradiation is applied in step (4) and the aqueous, radiation-curable coating composition comprises one or more photo-initiators.

20. The process of claim 1, wherein the drying comprises drying the aqueous, radiation-curable coating composition at a temperature higher than 30° C. to evaporate water and optionally organic solvent and other volatile compounds from the aqueous, radiation-curable coating composition.

* * * * *